(12) United States Patent
Dai et al.

(10) Patent No.: US 9,843,070 B2
(45) Date of Patent: Dec. 12, 2017

(54) ULTRA-FAST RECHARGEABLE METAL-ION BATTERY

(71) Applicants: The Board of Trustees of the Leland Stanford Junior University, Stanford, CA (US); Industrial Technology Research Institute, Chutung, Hsinchu (TW)

(72) Inventors: Hongjie Dai, Palo Alto, CA (US); Meng-Chang Lin, Palo Alto, CA (US); Ming Gong, Palo Alto, CA (US); Bingan Lu, Palo Alto, CA (US); Yingpeng Wu, Palo Alto, CA (US)

(73) Assignees: The Board of Trustees of the Leland Stanford Junior University, Stanford, CA (US); Industrial Technology Research Institute, Chutung (TW)

(*) Notice: Subject to any disclaimer, the term of this patent is extended or adjusted under 35 U.S.C. 154(b) by 215 days.

(21) Appl. No.: 14/622,692

(22) Filed: Feb. 13, 2015

(65) Prior Publication Data

US 2015/0249261 A1 Sep. 3, 2015

Related U.S. Application Data

(60) Provisional application No. 61/946,618, filed on Feb. 28, 2014, provisional application No. 62/076,420, filed on Nov. 6, 2014.

(51) Int. Cl.
*H01M 10/054* (2010.01)
*H01M 4/46* (2006.01)
(Continued)

(52) U.S. Cl.
CPC .......... *H01M 10/054* (2013.01); *H01M 4/46* (2013.01); *H01M 10/0568* (2013.01);
(Continued)

(58) Field of Classification Search
None
See application file for complete search history.

(56) References Cited

U.S. PATENT DOCUMENTS 3,980,496 A * 9/1976 Ludwig ............. H01M 10/3909
429/103
4,463,072 A * 7/1984 Gifford ................... H01M 4/36
252/182.1
(Continued)

FOREIGN PATENT DOCUMENTS

| CN | 104241596 A | 12/2014 |
| WO | WO-2013/049097 A1 | 4/2013 |
| WO | WO 2013049097 A1 * | 4/2013 ............ H01M 10/05 |

OTHER PUBLICATIONS

Chen, Z. et al., "Three-Dimensional Flexible and Conductive Interconnected Graphene Networks Grown by Chemical Vapour Deposition," Nat. Mater. 10, 424-428 (2011).
(Continued)

*Primary Examiner* — Daniel Gatewood
(74) *Attorney, Agent, or Firm* — Foley & Lardner LLP; Cliff Z. Liu

(57) ABSTRACT

A metal-ion battery includes: (1) an anode including aluminum; (2) a cathode including a layered, active material; and (3) an electrolyte disposed between the anode and the cathode to support reversible deposition and dissolution of aluminum at the anode and reversible intercalation and de-intercalation of anions at the cathode.

15 Claims, 17 Drawing Sheets

(51) Int. Cl.
*H01M 10/0568* (2010.01)
*H01M 10/0569* (2010.01)
*H01M 4/58* (2010.01)
*H01M 4/48* (2010.01)
*H01M 4/02* (2006.01)
*H01M 4/38* (2006.01)
*H01M 4/587* (2010.01)

(52) U.S. Cl.
CPC .......... H01M 10/0569 (2013.01); *H01M 4/38* (2013.01); *H01M 4/386* (2013.01); *H01M 4/483* (2013.01); *H01M 4/58* (2013.01); *H01M 4/581* (2013.01); *H01M 4/587* (2013.01); *H01M 2004/021* (2013.01); *H01M 2300/0031* (2013.01); *Y10T 29/49108* (2015.01); *Y10T 29/49115* (2015.01)

(56) References Cited

U.S. PATENT DOCUMENTS

| | | | |
|---|---|---|---|
| 4,767,683 A * | 8/1988 | Yamada | H01M 2/30 429/101 |
| 5,554,458 A | 9/1996 | Noda et al. | |
| 6,139,989 A * | 10/2000 | Kawakubo | H01M 4/13 429/217 |
| 2004/0186201 A1* | 9/2004 | Stoffer | C09C 1/56 523/215 |
| 2010/0316914 A1 | 12/2010 | Correia | |
| 2012/0045688 A1* | 2/2012 | Liu | H01G 11/06 429/207 |
| 2012/0058392 A1 | 3/2012 | Correia | |
| 2012/0082904 A1 | 4/2012 | Brown et al. | |
| 2012/0082905 A1 | 4/2012 | Brown et al. | |
| 2013/0319870 A1* | 12/2013 | Chen | H01M 4/133 205/86 |

OTHER PUBLICATIONS

Yu, X. et al, "Super Long-Life Supercapacitors Based on the Construction of Nanohoneycomb-Like Strongly Coupled $CoMoO_4$-3D Graphene Hybrid Electrodes," Advanced Materials 26, 1044-1051 (2014).

International Search Report and Written Opinion for International Application No. PCT/US2015/018154 dated May 28, 2015.

Extended European Search Report in EP Application No. 15755807.3, dated Jun. 26, 2017.

Jayaprakash, N. et al. (2011) "The Rechargeable Aluminum-ion Battery," Chem. Commun. 47:12610-12612.

* cited by examiner

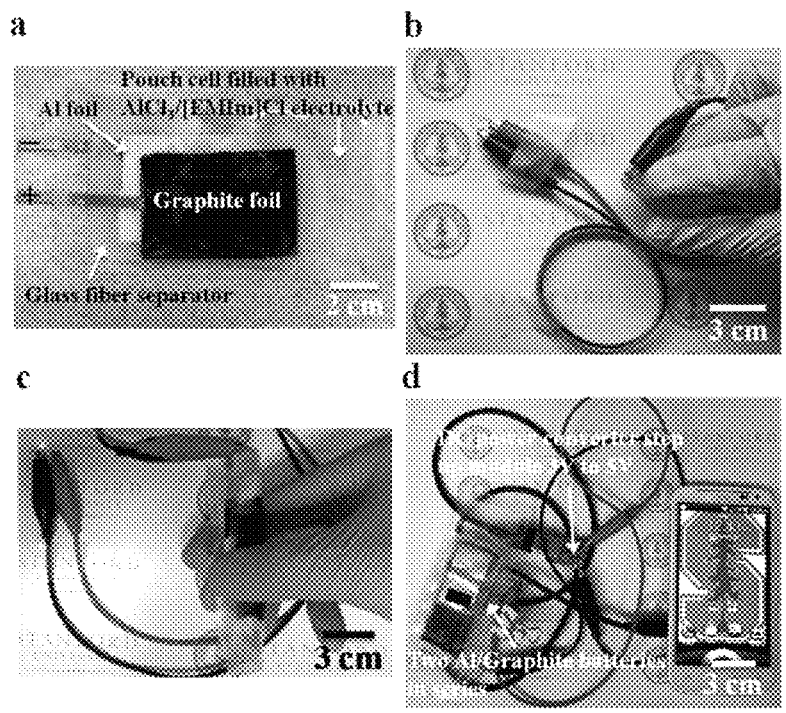

Fig. 22

Table 1

| System | Electrode capacity (Ah/kg) | Cell capacity (Ah/kg) | Cell voltage (V) | Energy density (Wh/kg) | Electrode cost ($/kg) | Energy cost ($US/Wh) | Electrolyte ($US/kg) |
|---|---|---|---|---|---|---|---|
| Li-ion battery (LiC$_6$-LiCoO$_2$) | 274/372 (LiCoO$_2$)/(C) | 158 | 4.0 | 632 | 1100/2 (LiCoO$_2$)/(C) | 1.0 | 800 (EC+DMC+DEC+ LiPF$_6$) |
| Al-ion battery (Al-C$_n$Al$_x$Cl$_y$) | 2980/372 (Al)/(C) | 331 | 2.0 | 662 | 3/2 (Al)/(C) | 0.003 | 1000 (EMIC:AlCl$_3$ = 1:1.3 in molar ratio) |

*Calculation is based on the weight of anode and cathode materials.

Fig. 23 understand# ULTRA-FAST RECHARGEABLE METAL-ION BATTERY

CROSS-REFERENCE TO RELATED APPLICATIONS

This application claims the benefit of U.S. Provisional Application No. 61/946,618, filed on Feb. 28, 2014, and the benefit of U.S. Provisional Application No. 62/076,420, filed on Nov. 6, 2014, the disclosures of which are incorporated herein by reference in their entireties.

BACKGROUND

Due to the low cost, low flammability and 3-electron redox properties of aluminum (Al), rechargeable Al-based batteries could offer cost-effectiveness, high capacity and safety, leading to a breakthrough of energy storage technology. However, research over the past several years on rechargeable Al batteries have not been as successful as other types of batteries, plagued by problems of disintegration of cathode material, low cell discharge voltage, capacitive behavior without discharge voltage plateaus, and insufficient cycle life with fast battery capacity decay.

It is against this background that a need arose to develop embodiments of this disclosure.

SUMMARY

In certain embodiments, a metal-ion battery includes: (1) an anode including aluminum; (2) a cathode including a layered, active material; and (3) an electrolyte disposed between the anode and the cathode to support reversible deposition and dissolution of aluminum at the anode and reversible intercalation and de-intercalation of anions at the cathode.

In some embodiments, the layered, active material is graphite. In some embodiments, the graphite is pyrolytic graphite.

In some embodiments, the layered, active material is a layered double hydroxide, a layered oxide, or a layered chalcogenide.

In some embodiments, the layered, active material has a porosity in the range of 0.05 to 0.95.

In some embodiments, the electrolyte corresponds to a mixture of an aluminum halide and an ionic liquid, and a molar ratio of the aluminum halide to the ionic liquid is greater than 1.1. In some embodiments, the aluminum halide is $AlCl_3$, and the ionic liquid is 1-ethyl-3-methylimidazolium chloride. In some embodiments, the molar ratio of $AlCl_3$ to 1-ethyl-3-methylimidazolium chloride is greater than 1.2. In some embodiments, a water content of the electrolyte is no greater than 1,000 ppm.

In additional embodiments, a metal-ion battery includes: (1) an aluminum anode; (2) a porous graphite cathode; and (3) an ionic liquid electrolyte disposed between the aluminum anode and the porous graphite cathode.

In some embodiments, the porous graphite cathode has a porosity in the range of 0.05 to 0.95. In some embodiments, the porosity is in the range of 0.3 to 0.9.

In some embodiments, the ionic liquid electrolyte corresponds to a mixture of an aluminum halide and an ionic liquid, and a molar ratio of the aluminum halide to the ionic liquid is greater than 1.1. In some embodiments, a water content of the ionic liquid electrolyte is no greater than 1,000 ppm. In some embodiments, the water content is no greater than 400 ppm.

In additional embodiments, a method of manufacturing a metal-ion battery includes: (1) providing an anode including aluminum; (2) providing a cathode including an active material capable of intercalating ions during charging and de-intercalating the ions during discharging, wherein the active material is selected from at least one of a carbon-containing material, a silicon-containing material, and a germanium-containing material; and (3) providing an electrolyte capable of supporting reversible deposition and dissolution of aluminum at the anode and reversible intercalation and de-intercalation of the ions at the cathode.

In some embodiments, providing the cathode includes providing a porous graphite material. In some embodiments, providing the porous graphite material includes forming a graphite foam through deposition on a porous, sacrificial template. In some embodiments, providing the porous graphite material includes expanding a graphite material through electrochemical hydrogen evolution.

In some embodiments, providing the electrolyte includes electrochemically drying the electrolyte, such that a water content of the electrolyte is no greater than 400 ppm.

In additional embodiments, a graphite foam for a metal-ion battery is formed by chemical vapor deposition on a sacrificial template, followed by etching removal of the sacrificial template.

In additional embodiments, a method of manufacturing includes electrochemically drying an electrolyte to reduce a water content of the electrolyte.

In further embodiments, a method of forming a porous graphite includes electrochemically exfoliating graphite, followed by hydrogen evolution reaction to expand the exfoliated graphite.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 22: Flexible Al-graphite battery. a, A photograph of the fully-assembled Al/graphite battery. b, c Demonstration of the bendable Al/graphite battery turning on a red LED in bent conditions. d, Two Al/Graphite batteries were connected in series to yield DC of about 3-4 V, then connected to a DC power converter to generate DC of about 5 V, about 1 A to charge a smart phone.

FIG. 23: Calculated theoretical capacity and energy cost for aluminum-ion and Li-ion batteries.

DETAILED DESCRIPTION

Figure 1:
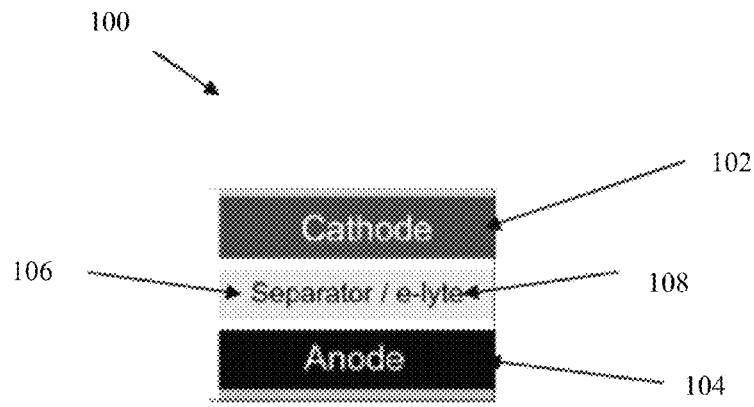
FIG. 1: Schematic of a metal-ion battery.

Developing new types of rechargeable battery systems could fuel broad applications from personal electronics to grid storage. Some embodiments of this disclosure are directed to a high performance rechargeable metal-ion battery, such as an aluminum battery with high-rate capability using an Al metal anode and improved graphitic materials as a cathode. The improved graphitic cathode materials can afford rechargeable Al batteries operating in an ionic liquid with superior performance in terms of discharge voltage profile, cycling stability, and rate capability. The battery can operate by electrochemical redox deposition/dissolution of aluminum and graphite redox reactions through chloroaluminate anion intercalation/de-intercalation of graphite in a highly safe, non-flammable ionic liquid electrolyte. In some embodiments, the battery can exhibit well-defined discharge voltage plateaus near about 2 V, a specific capacity of about 70 mAh g$^{-1}$, and about 98% Coulombic efficiency. More generally, (1) a voltage plateau can be in the range of about 2.25 V to about 1.5 V; (2) a specific (charge or discharge) capacity can be at least about 50 mAh g$^{-1}$, at least about 60 mAh g$^{-1}$, at least about 70 mAh g$^{-1}$, at least about 80 mAh g$^{-1}$, at least about 90 mAh g$^{-1}$, at least about 100 mAh g$^{-1}$, or at least about 110 mAh g$^{-1}$, and up to about 127 mAh g$^{-1}$ or more; (3) at least about 50% of an initial discharge capacity is retained after 300, 500, or 1,000 charge/discharge cycles, such as at least about 60%, at least about 70%, at least about 80%, at least about 85%, at least about 90%, at least about 93%, at least about 95%, or at least about 98%, and up to 99% or more; and (4) a Coulombic efficiency can be at least about 70%, at least about 75%, at least about 80%, at least about 85%, at least about 90%, at least about 95%, or at least about 98%, and up to about 99% or more, where cycling is under a current density of C/10, C/5, C/4, C/2, 1C, 2C, or another higher or lower reference rate. In some embodiments, at least about 50% of a reference discharge capacity when cycling under a reference current density (e.g., 1C) is retained when cycling under 2 times, 5 times, 10 times, or 50 times the reference current density (e.g., 2C, 5C, 10C, or 50C), such as at least about 60%, at least about 70%, at least about 80%, at least about 85%, at least about 90%, at least about 93%, at least about 95%, or at least about 98%, and up to 99% or more. In some embodiments, an improved three-dimensional (3D) graphitic porous cathode can provide fast anion transport, infiltration and diffusion from electrolyte to cathode, affording unprecedented charging time of about 1 minute under high charging current densities of about 4,000 mA g$^{-1}$ (about 3,000 W kg$^{-1}$) impressively over about 7,500 cycles without noticeable capacity decay. The low cost, high safety, high stability and high speed Al battery opens a path for an improved energy storage system.

As shown in an embodiment of FIG. 1, a metal-ion battery 100 includes a cathode 102, an anode 104, and a separator 106 that is disposed between the cathode 102 and the anode 104. The battery 100 also includes an electrolyte 108, which is disposed between the cathode 102 and the anode 104. The battery 100 is a secondary battery that is rechargeable, although primary batteries also are encompassed by this disclosure.

In the illustrated embodiment, the battery 100 is an aluminum battery, although other types of metal-ion batteries are encompassed by this disclosure. The anode 104 includes aluminum, such as a non-alloyed form of aluminum or an aluminum alloy. More generally, a suitable anode material can include one or more of an alkali metal (e.g., lithium, potassium, sodium, and so forth), an alkaline earth metal (e.g., magnesium, calcium, and so forth), a transition metal (e.g., zinc, iron, nickel, cobalt, and so forth), a main group metal or metalloid (e.g., aluminum, silicon, tin, and so forth), and a metal alloy of two or more of the foregoing elements (e.g., an aluminum alloy).

The separator 106 mitigates against electrical shorting of the cathode 102 and the anode 104, and the electrolyte 108 supports reversible deposition and dissolution (or stripping) of aluminum at the anode 104, and reversible intercalation and de-intercalation of anions at the cathode 102. The electrolyte 108 can include an ionic liquid, which can support reversible redox reaction of a metal or a metal alloy included in the anode 104. Examples of ionic liquids include aluminates, such as alkylimidazolium aluminates, alkylpyridinium aluminates, alkylfluoropyrazolium aluminates, alkyltriazolium aluminates, aralkylammonium aluminates, alkylalkoxyammonium aluminates, aralkylphosphonium aluminates, aralkylsulfonium aluminates, alkylguanidinium aluminates, and mixtures thereof. For example, the electrolyte 108 can correspond to, or can include, a mixture of an aluminum halide and an ionic liquid, and a molar ratio of the aluminum halide and the ionic liquid is at least or greater than about 1.1 or at least or greater than about 1.2, and is up to about 1.5, up to about 1.8, or more, such as where the aluminum halide is $AlCl_3$, the ionic liquid is 1-ethyl-3-methylimidazolium chloride, and the molar ratio of the aluminum chloride to 1-ethyl-3-methylimidazolium chloride is at least or greater than about 1.2. An ionic liquid electrolyte can be doped (or have additives added) to increase electrical conductivity and lower the viscosity, or can be otherwise altered to yield compositions that favor the reversible electrodeposition of metals.

Higher Coulombic efficiency and higher cycling stability can be attained by reducing a water content of the electrolyte 108, such as to a level no greater than about 7,500 parts per million (ppm), no greater than about 5,000 ppm, no greater than about 2,000 ppm, no greater than about 1,000 ppm, no greater than about 900 ppm, no greater than about 800 ppm, no greater than about 700 ppm, no greater than about 600 ppm, no greater than about 500 ppm, no greater than about 400 ppm, no greater than about 300 ppm, no greater than about 200 ppm, or no greater than about 100 ppm, and down to about 50 ppm, down to about 10 ppm, or less. In some implementations, a reduced water content can be attained by electrochemical drying of water, such as by cycling the battery 100 through one or more charge/discharge cycles, during which residual water in the electrolyte 108 can be consumed by decomposition into $H_2$ gas that can be released from the battery 100.

The cathode 102 includes an active material that is capable of reversibly intercalating or otherwise incorporating metal anions from the electrolyte 108, such as intercalating chloroaluminate anions during charging and de-intercalating the chloroaluminate anions during discharging. Suitable cathode materials can include one or more of various two-dimensional (2D) layered materials or 3D materials. 2D materials can include multiple sheets or layers, with covalent bonding between atoms of a particular sheet or layer, and weaker interactions, such as Van der Waals bonding, between sheets or layers, although a single-layered material also can be a suitable 2D material. 3D materials can include 3D crystalline materials as well as layered materials in which at least some extent of covalent bonding occurs between sheets or layers of the layered materials. Examples of suitable cathode materials include (1) carbon-containing (or carbonaceous) materials, such as graphitic materials (e.g., graphitic foil, graphite foam (or other porous structures), graphitic films, graphitic fibers, graphitic powders, or graphitic particles; graphene materials; and carbon nanotube materials), (2) a layered double hydroxide, (3) a layered oxide, (4) a layered chalcogenide, (5) silicon (or other silicon-containing materials), (6) germanium (or other germanium-containing materials), (7) other Group IV-containing materials, and (8) gallium arsenide (GaAs), among others.

For example, the cathode 102 can include a 2D material that is graphitic.

As another example, the cathode 102 can include a 3D material in the form of pyrolytic graphite, in which covalent bonding occurs between adjacent graphene sheets.

As another example, the cathode 102 can include a 3D material in the form of graphite foam, which can be formed as graphite whiskers or other elongated structures on a sacrificial template by chemical vapor deposition, followed by etching removal of the sacrificial template. A width (e.g., an individual or average width, diameter, or other lateral dimension) of graphite whiskers in a graphite foam can be in the range of about 200 nm to about 2,000 µm, about 500 nm to about 1,500 µm, about 500 nm to about 1,000 µm, about 1 µm to about 1,000 µm, about 1 µm to about 900 µm, about 1 µm to about 800 µm, about 1 µm to about 700 µm, about 1 µm to about 600 µm, about 1 µm to about 500 µm, about 10 µm to about 500 µm, about 10 µm to about 400 µm, about 10 µm to about 300 µm, or about 10 µm to about 200 µm. A porous graphite structure also be formed by expanding a graphite material, such as thermal heating and exfoliating of pyrolytic graphite after one or more charge/discharge cycles and then electrochemical hydrogen evolution reaction in a basic solution, during which hydrogen gas can expand the pyrolytic graphite into a porous structure. In some implementations, a characteristic of a graphite or graphitic foam is its porosity, which is a measure of the extent of voids resulting from the presence of pores or any other open spaces in the foam. A porosity can be represented as a ratio of a volume of voids relative to a total volume, namely between 0 and 1, or as a percentage between 0% and 100%. In some implementations, a graphitic foam can have a porosity that is at least about 0.05 or at least about 0.1 and up to about 0.95, and, more particularly, a porosity can be in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8. Techniques for determining porosity include, for example, porosimetry and optical or scanning techniques.

As a further example, the cathode 102 can include a 3D material such as silicon or germanium.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Figure 6:
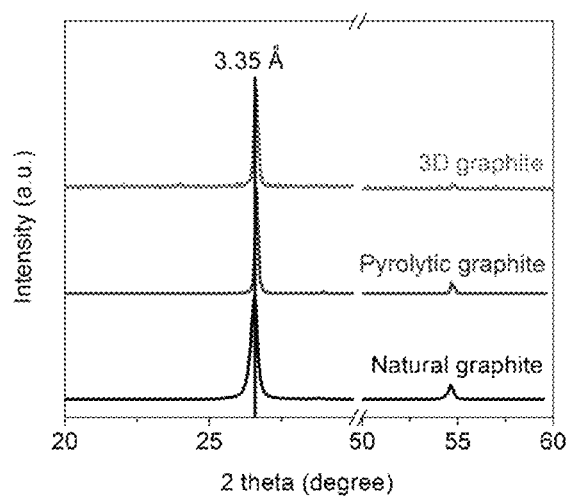
FIG. 6: X-ray diffraction patterns of graphitic cathode materials. The natural graphite, pyrolytic graphite, and 3D graphite exhibited typical graphite structure, with a sharp (002) X-ray diffraction (XRD) graphite peak at 2θ of about 26.55° (d-space=3.35 Å).

Al batteries (schematic plot in FIG. 2a) are constructed in Swagelok or pouch cells, using an aluminum foil (thickness of about 15-250 µm) anode and a graphitic cathode formed of a pyrolytic graphite (PG) foil (about 17 µm) or a 3D graphite foam in an AlCl$_3$/1-ethyl-3-methylimidazolium chloride ([EMIm]Cl) ionic liquid (IL) electrolyte [see Materials and Methods]. Both the PG foil and 3D graphitic foam materials exhibited typical graphite structure, with a sharp (002) X-ray diffraction (XRD) graphite peak at 2θ=about 26.55° (d-space=about 3.35 Å) (FIG. 6). The cell was first optimized in a Swagelok cell operating at about 25° C. using a PG foil cathode. The optimal ratio of AlCl$_3$/[EMIm]Cl was found to be about 1.3 to about 1.5 (FIG. 7), affording a specific discharge capacity of about 60-66 mAh g$^{-1}$ (based on the mass of graphite) with a Coulombic efficiency of about 95-98%. Raman spectroscopy is performed to reveal that in the ionic liquid electrolyte with AlCl$_3$/[EMIm]Cl ratio of about 1.3, both AlCl$_4$ and Al$_2$Cl$_7$ anions were abundant (FIG. 7) with [AlCl$_4$]/[Al$_2$Cl$_7$] of about 2.33. The cathode specific discharging capacity (capacity/mass) was found substantially independent of graphite mass (FIG. 8a,b), indicating that the entire thickness of the graphitic foil participated in the cathode reaction.

Figure 9:
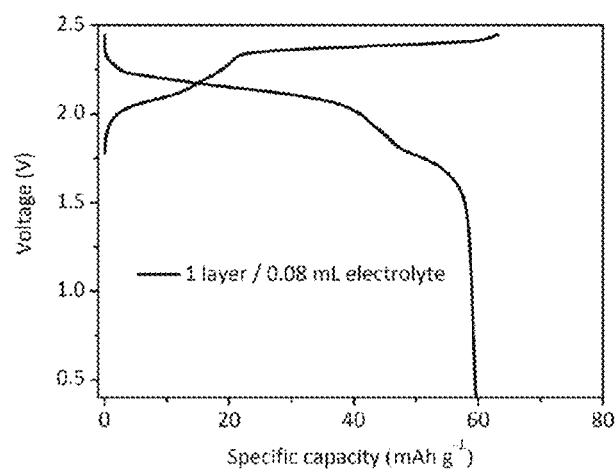
FIG. 9: Galvanostatic charge and discharge curves of an Al/PG cell. The cell was installed with one layer of glassy separator and about 0.08 mL of ionic liquid electrolyte, indicating a reduced amount of electrolyte could be about 0.02 mL per mg of PG. The electrochemical study was performed in AlCl$_3$/[EMIm]Cl=about 1.3 (by mole) ionic liquid electrolyte at a current density of about 66 mA g$^{-1}$ in a Swagelok-type cell.
Figure 10:
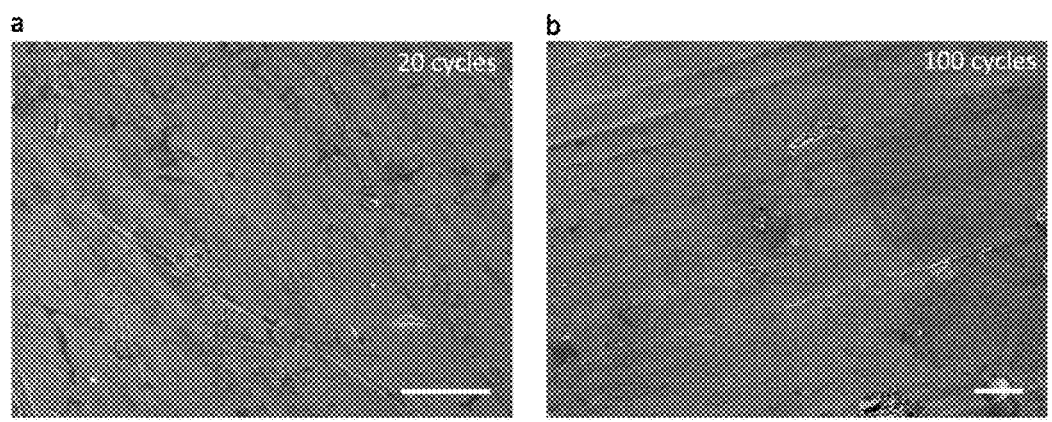
FIG. 10: Surface observation of Al anode which was obtained from an Al/PG cell after being cycled for a, 20 and b, 100 cycles, respectively, indicating no dendrite formation over cycling. Scale bars equal 10 μm.

The Al/PG cell exhibited clear discharge voltage plateaus in the range of about 2.25 to about 2.0 V and about 1.9 to about 1.5 V (FIG. 2b), respectively. The relatively high discharge voltage plateaus were unprecedented among reported Al-ion charge-storage systems. Similar cell operation was observed with the electrolyte amount lowered to about 0.02 mL per mg of cathode material (FIG. 9). Charge-discharge cycling at a current density of about 66 mAg$^{-1}$ (1C charging rate) showed high stability of the Al/PG cell, retaining nearly or substantially 100% of the specific capacity over >200 cycles with 98.1±0.4% Coulombic efficiency (see FIG. 2c). This was consistent with the high reversibility of Al anode dissolution/deposition with Coulombic efficiencies of about 98.6-99.8% in ionic electrolytes. Under the battery operating condition, no dendrite formation was observed on the Al electrode over cycling (FIG. 10). To maintain a Coulombic efficiency >about 96%, the cut-off voltage of Al/PG cell was set <about 2.45 V, above which reduced efficiencies were observed (see FIG. 11a) likely due to side reactions (especially above about 2.6 V) involving the electrolyte as probed by cyclic voltammetry with a glassy carbon electrode against Al (FIG. 11b).

Figure 11:
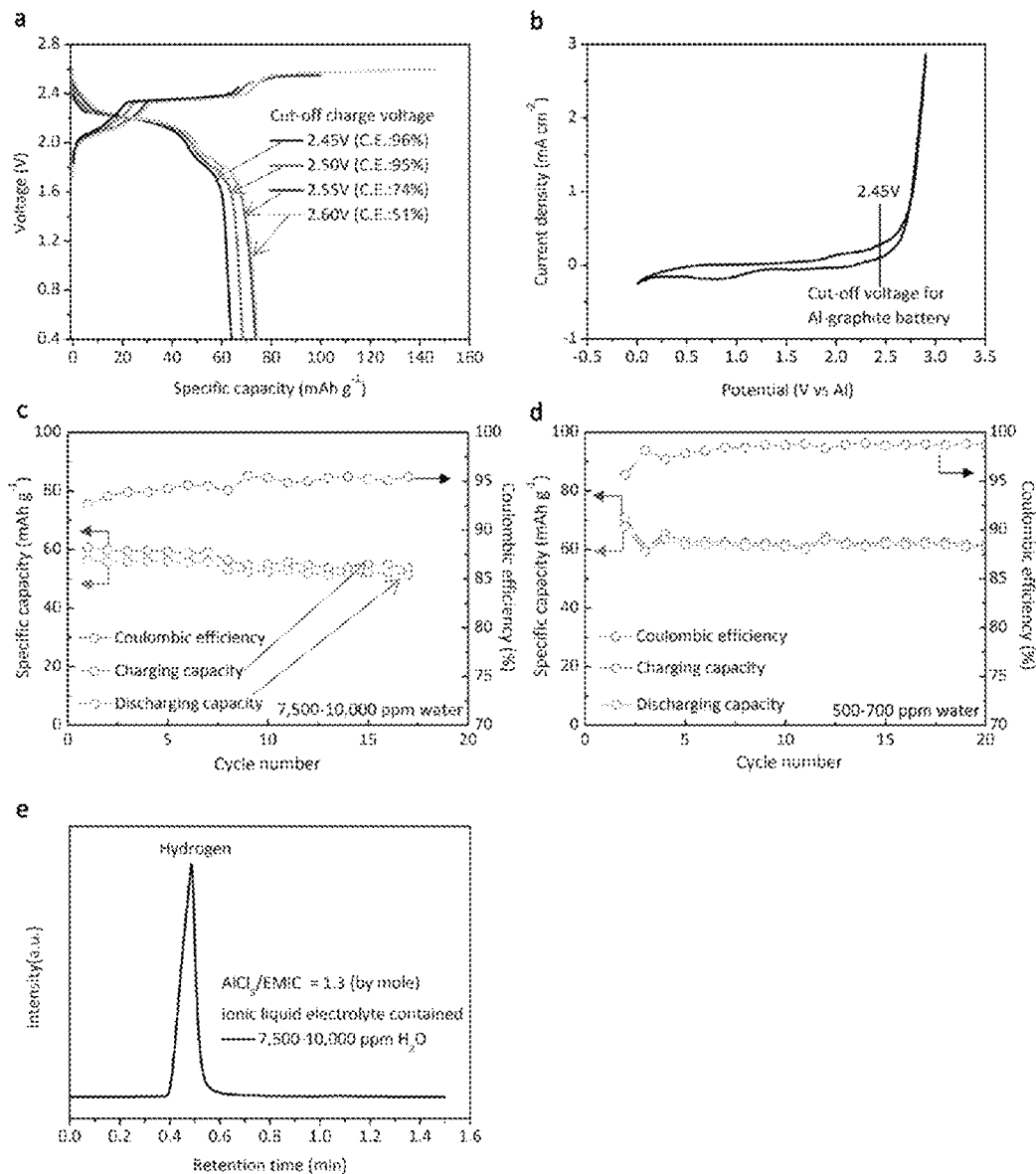
FIG. 11: Electrochemical stability of AlCl$_3$/[EMIm]Cl ionic liquid electrolyte. a, Galvanostatic curves of Al/PG cells with different cut-off charge voltages at about 66 mA g$^{-1}$ in a Swagelok-type cell. b, Cyclic voltammetry curve of an Al/Glassy carbon cell at about 10 mV s$^{-1}$ in a Swagelok-type cell. c-d, Stability test of Al/natural graphite pouch cell at about 66 mA g$^{-1}$ in electrolytes containing c, about 7,500-10,000 ppm and d, about 500-700 ppm H$_2$O. The Coulombic efficiencies are about 95.2 and about 98.6%, and the discharging capacities are about 54.9 and about 61.8 mAh g$^{-1}$ at 15$^{th}$ cycle, respectively. e, Gas chromatography spectrum of gaseous samples withdrawn from Al/Graphite cells after 30 cycles using electrolyte with about 7,500-10,000 H$_2$O content. The peak found in the retention time of about 0.5 min corresponds to hydrogen gas and matches to the retention time of pure hydrogen gas as calibration gas.

Lowered Coulombic efficiency and cycling stability of the Al battery cell are observed when using electrolyte containing higher water content up to about 7,500 ppm (FIG. 11c,d), accompanied by noticeable H$_2$ gas evolution measured by gas chromatography (FIG. 11e). This indicated side reactions triggered by the presence of water residue in the electrolyte with H$_2$ evolution under reducing potential on the Al side during charging. Further lowering the water content in the ionic liquid electrolyte can be desirable to enhance the Coulombic efficiency of the Al/graphite cells.

Figure 4:
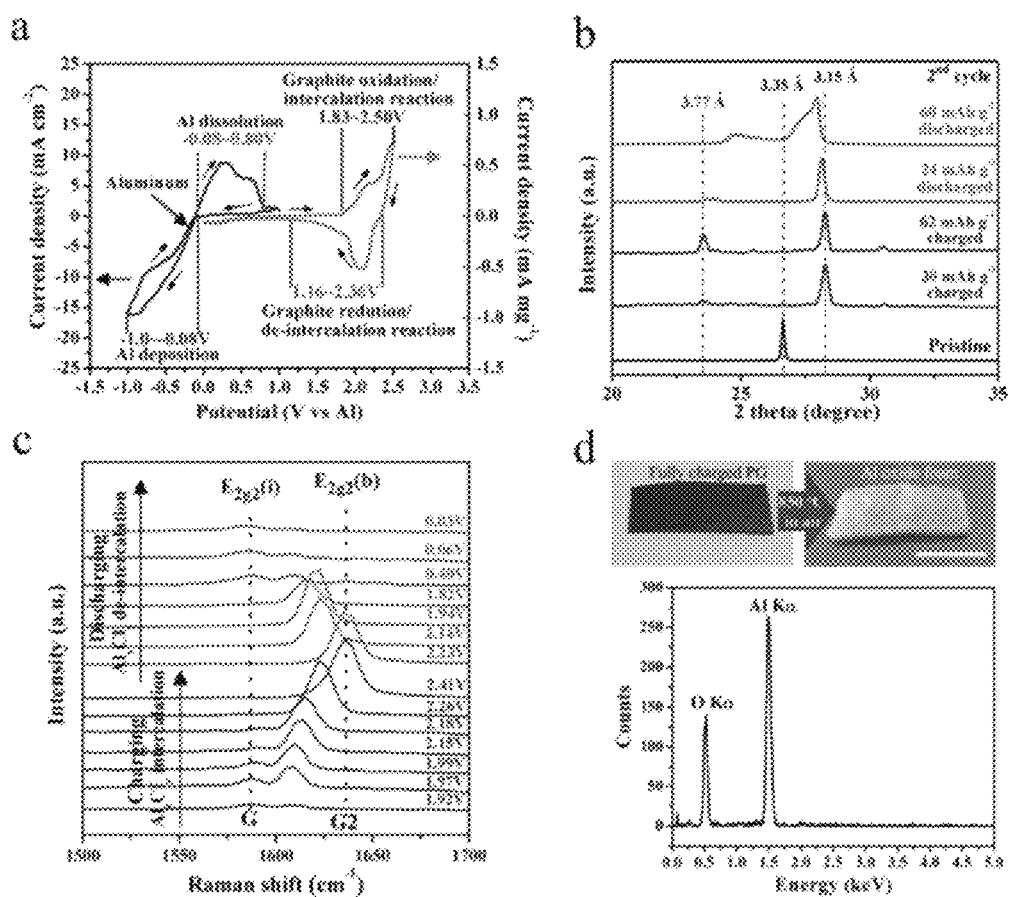
FIG. 4: Al-ion battery reaction mechanisms. a, Cyclic voltammetry curves of Al foil and pyrolytic graphite (PG) at a scan rate of about 10 mV s$^{-1}$ against an Al electrode. b, Ex situ X-ray diffraction (XRD) patterns of PG in various charging and discharging states through the 2$^{nd}$ cycle. c, In situ Raman spectra recorded for the PG cathode through a charge-discharge cycle showing chloroaluminate anion intercalation/de-intercalation into graphite. d, After calcination of a fully charged (about 62 mAh g$^{-1}$) PG at about 850° C. in air, the sample transformed into a white foam made of aluminum oxide. The scale bar corresponds to 1 cm. All electrochemical studies were performed in AlCl$_3$/[EMIm]Cl=about 1.3 (by mole) ionic liquid electrolyte.
Figure 7:
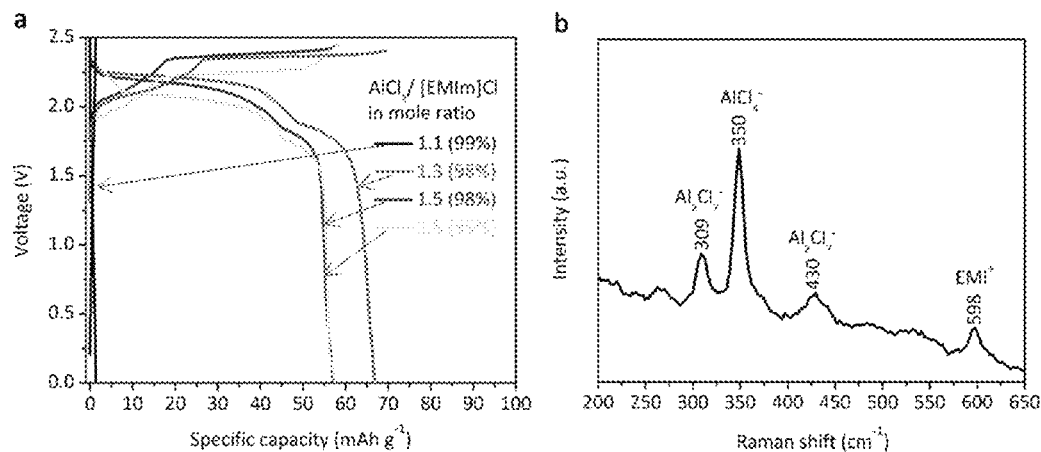
FIG. 7: Optimal ratio of AlCl$_3$/[EMIm]Cl ionic liquid electrolyte. a, Galvanostatic charge and discharge curves of Al/pyrolytic graphite cells at a current density of about 66 mA g$^{-1}$ in various mole ratios (about 1.1, about 1.3, about 1.5, and about 1.8) of AlCl$_3$/[EMIm]Cl ionic liquid electrolytes in a Swagelok-type cell. The Coulombic efficiencies of cells are shown in the parentheses. b, Raman spectrum recorded with a mixed AlCl$_3$/[EMIm]Cl=about 1.3 (by mole) ionic liquid electrolyte.
Figure 8:
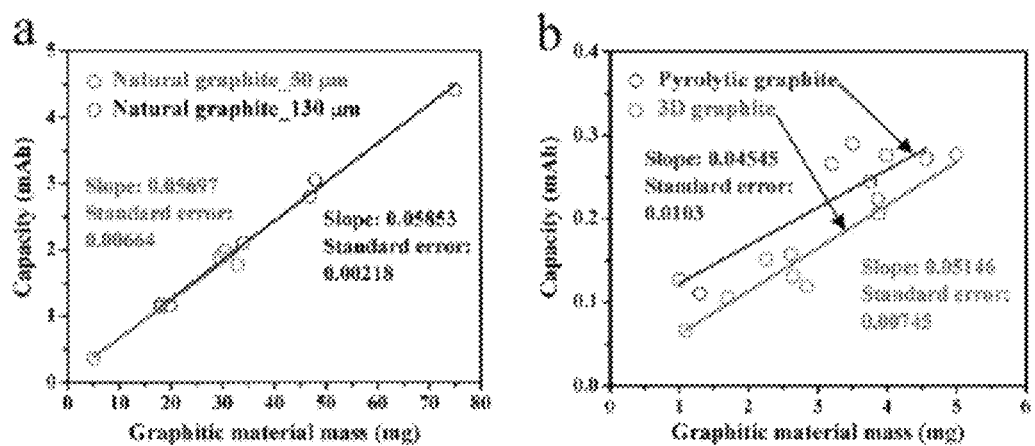
FIG. 8: Calculated Al/graphite cell discharging capacity with different graphitic material mass. a, Natural graphite foil in about 50 μm and about 130 μm thickness and b, Pyrolytic graphite and 3D graphite, indicating the entire graphitic material participated in the cell cathode reaction.
Figure 13:
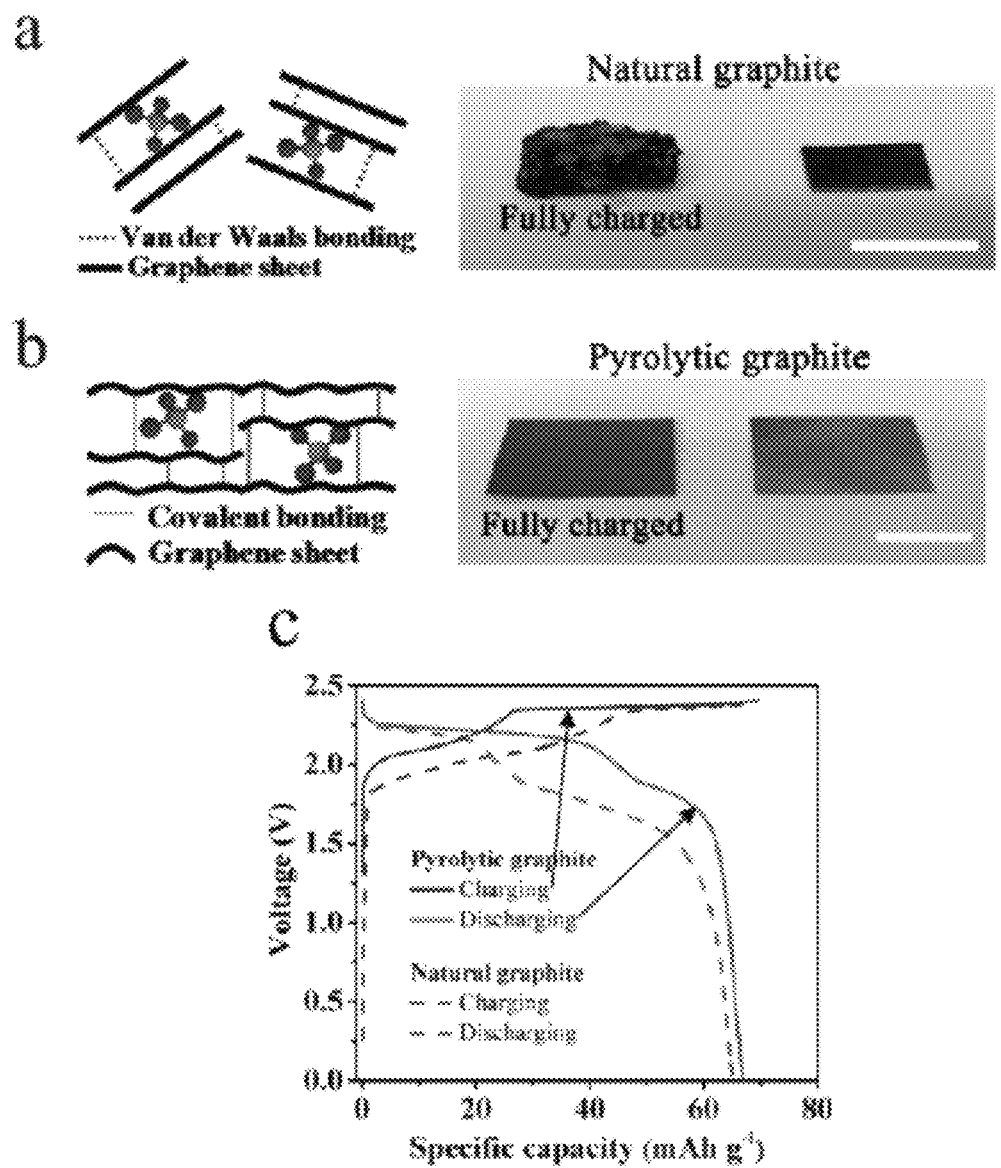
FIG. 13: Advantages of pyrolytic graphite as cathode for Al/graphite cell. Photographs of a, Natural graphite and b, Pyrolytic graphite before and after fully charged in AlCl$_3$/[EMIm]Cl=about 1.3 (by mole) ionic liquid electrolyte. Scale bars equal 1 cm. The schematic plots indicate the chemical bonds between the graphene sheets of natural graphite (Van der Waals bonding) and pyrolytic graphite (Covalent bonding). c, Galvanostatic charge and discharge curves of Al/pyrolytic graphite cell (at about 66 mA g$^{-1}$) and Al/natural graphite cell (at about 33 mA g$^{-1}$) in AlCl$_3$/[EMIm]Cl=about 1.3 (by mole) ionic liquid electrolyte in a Swagelok-type cell.

The Al/pyrolytic graphite foil cell showed reduced rate capability with lowered specific capacity when charged and discharged at higher than 1C rate (FIG. 7). It is proposed that cathode reactions in the Al/pyrolytic graphite cell involve intercalation/de-intercalation of relatively large chloroaluminate (Al$_x$Cl$_y^-$) anions in graphite (see FIG. 4 for XRD evidence of intercalation), and the rate capability is limited by slow diffusion of anions through the graphitic layers in a pyrolytic graphite foil. Graphite intercalation is hinted when a natural graphite (NG) foil was used to replace the PG cathode in an Al/graphite cell, with a dramatic expansion of the natural graphite by around 50-fold into loosely stacked flakes as observed during charging (FIG. 13a), visible to the naked eye and indicative of anion diffusion, infiltration and intercalation into graphitic layers. In contrast, no apparent expansion of PG foil upon charging the Al/PG cell was visible (FIG. 13b) despite similar specific charging capacity for the two types of graphite foils (FIG. 13c). The superior structural integrity of pyrolytic graphite over natural graphite during charging and anion intercalation was attributed to the existence of covalent bonding between adjacent graphene sheets in pyrolytic graphite but not in natural graphite. Thus, the 3D bonded pyrolytic graphite foil was identified as an improved graphitic material for rechargeable Al battery, avoiding excessive electrode expansion and disintegration while allowing anion infiltration and diffusion through the graphitic stacks for intercalation.

As high-rate and high-power batteries are highly desired for applications such as electrical grid storage, investigation was performed on flexible 3D graphitic foam (FIG. 3a) formed on a Ni foam template by chemical vapor deposition (see Materials and Methods), aimed at developing a more open-framed graphitic structure for Al-graphite batteries to greatly reduce the anion infiltration and diffusion barriers for ultra-fast charge/discharge Al batteries. The width of the graphite whiskers in the foam (FIG. 3a) was about 100 μm, and the space between graphitic whiskers could greatly decrease the diffusion length of the anions and render the cathode materials highly accessible to the electrolyte to facilitate rapid battery operation.

Figure 2:
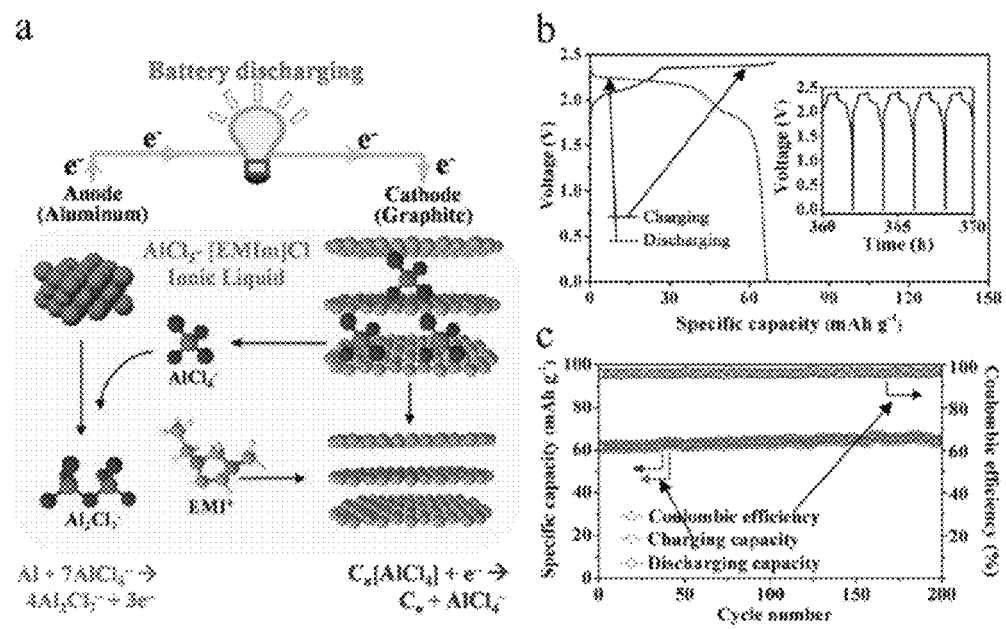
FIG. 2: Rechargeable Al battery. a, A schematic drawing of the Al/graphite cell during discharge. An aluminum foil was used as the anode, and a pyrolytic graphite foil or a three-dimensional (3D) graphite foam was used as the cathode in an optimal ratio of $AlCl_3$/[EMIm]Cl ionic liquid electrolyte. In the anode side, metallic Al, $AlCl_4^-$ and $Al_2Cl_7^-$ were active species during charge and discharge reactions, respectively. In the cathode side, predominantly $AlCl_4$ was intercalated and de-intercalated in the space between graphite layer planes during charge and discharge reactions, respectively. b, Galvanostatic charge and discharge curves of Al/pyrolytic graphite cell at a current density of about 66 mA $g^{-1}$. Inset shows charge and discharge cycles of the cell. c, Long-term stability test of Al/pyrolytic graphite cell at about 66 mA $g^{-1}$. The cells can be cycled to about 100% depth of discharge for at least 200 cycles and exhibited with >about 97% Coulombic efficiency. The electrochemical studies were performed in about 1.3:1 (in mole ratio) $AlCl_3$:[EMIm]Cl ionic liquid electrolyte in a Swagelok-type cell.
Figure 3:
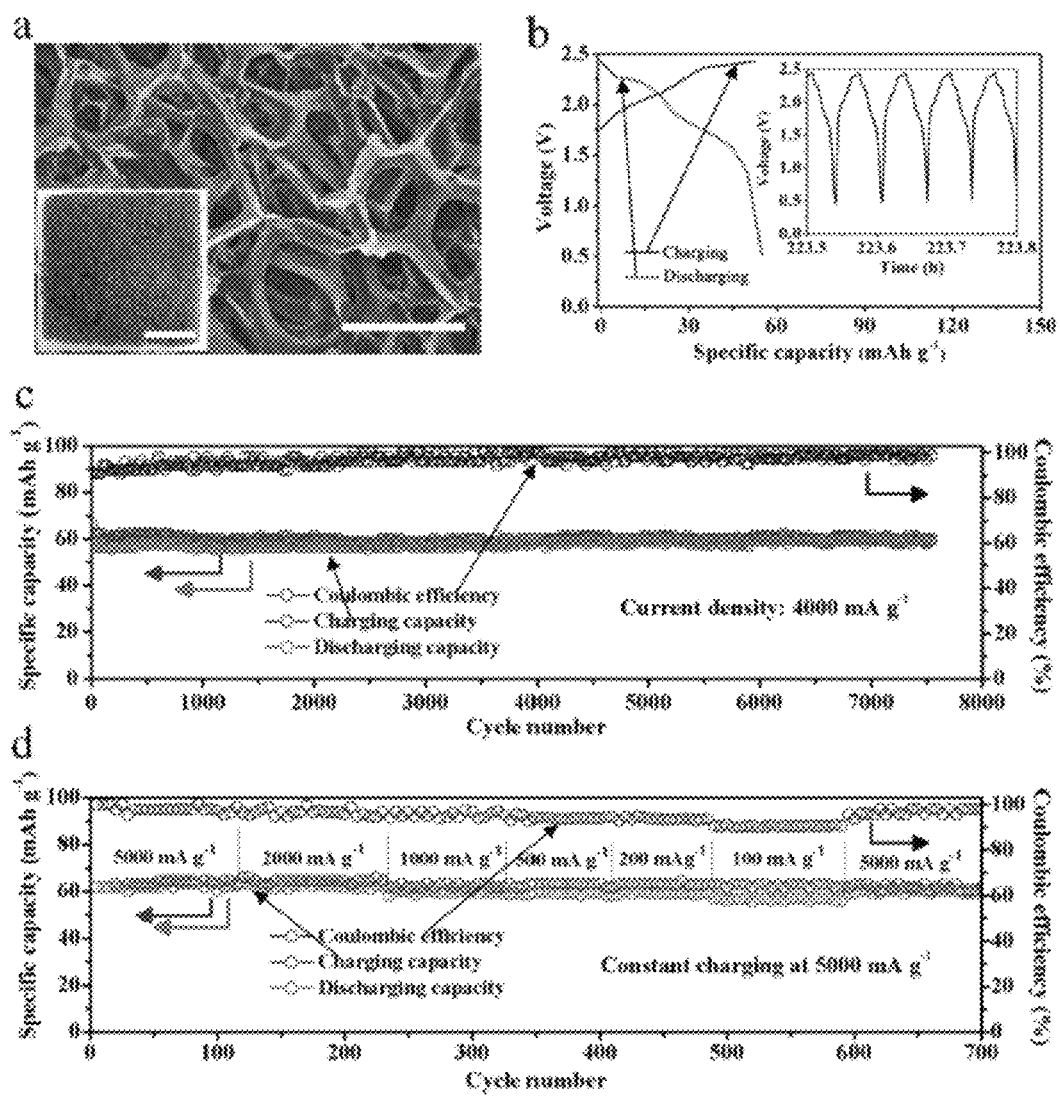
FIG. 3: An ultra-fast and stable rechargeable Al battery. a, A scanning electron microscopy image showing a 3D graphite foam with an open frame structure (graphitic whiskers in the foam skeleton is about 100 μm in size). Scale bar equals 300 μm. Inset: a photo of the foam. Scale bar equals 1 cm. b, Galvanostatic charge and discharge curves of an Al/3D graphite cell at a current density of about 4,000 mA g$^{-1}$. The discharge cut-off voltage was set at about 0.5 V to mitigate against the dissolution reaction of Ni foil (current collector) in the ionic liquid electrolyte. c, Long-term stability test of Al/3D graphite cell over 7,500 charging and discharging cycles at a constant current density of about 4,000 mA g$^{-1}$. d, Charging at about 5,000 mA g$^{-1}$ and discharging at various current densities ranging from about 100 to about 5,000 mA g$^{-1}$. The electrochemical studies were performed in AlCl$_3$/[EMIm]Cl=about 1.3 (by mole) ionic liquid electrolyte in a pouch cell.

Remarkably, the Al/3D graphite foam cell (in a pouch cell configuration) can be charged and discharged at a high current density up to about 5,000 mA g$^{-1}$, about 75 times (e.g., at a 75C rate, <1 min charge/discharge time) higher than the Al/PG cell but with a similar voltage profile and discharge capacity (about 60 mAh g$^{-1}$) (see FIGS. 2b and 3b for comparison). An impressive cycling stability of about 100% capacity retention was observed over 7,500 cycles with a Coulombic efficiency of 97±2.3% (FIG. 3c). This demonstrates an ultra-fast Al-ion battery with stability over thousands of cycles. The Al/3D graphite cell retained similar capacity and excellent cycling stability over a range of charge-discharge rates (about 1,000 to about 6,000 mA g$^{-1}$) with about 85-99% Coulombic efficiency (FIG. 14a). Another desirable aspect is that the cell can be rapidly charged (at about 5,000 mA g$^{-1}$, in about 1 min) and gradually discharged (down to about 100 mA g$^{-1}$, FIGS. 3d and 14b) in about 34 min while maintaining a high capacity (about 60 mAh g$^{-1}$). Such rapid charging/variable rate discharging can appeal to many real world applications.

Investigation was performed on the Al-ion battery operation mechanism and electrode reactions in the mixed AlCl$_3$/ [EMIm]Cl ionic liquid electrolyte with an optimal mole ratio of AlCl$_3$/[EMIm]Cl=about 1.3 (by mole). Cyclic voltammetry (CV) (FIG. 4a) observed a reduction wave from about −1.0 to about −0.08 V (vs. Al) and oxidation wave from about −0.08 to about 0.80 V (vs. Al) for the Al anode (FIG. 4a, left plot), corresponding to Al reduction/electrodeposition and oxidation/dissolution during charging and discharging, respectively. This was consistent with Al redox electrochemistry in ionic liquids via

$$4Al_2Cl_7^- + 3e^- \rightleftarrows Al + 7AlCl_4^- \tag{1}$$

and in line with Raman observation of both AlCl$_4$ and Al$_2$Cl$_7$ anions in the electrolyte (FIG. 7). On the graphitic cathode side, an oxidation wave of about 1.83 to about 2.50 V (vs. Al, FIG. 4a, right plot) and a reduction wave of about 1.16 to about 2.36 V (vs. Al) were observed (FIG. 4a, left plot), attributed to graphite oxidation and reduction through intercalation and de-intercalation of anions (mostly likely dominant by AlCl$_4^-$ due to its smaller size than Al$_2$Cl$_7^-$), respectively. The oxidation voltage range of about 1.83 to about 2.50 V (vs. Al, FIG. 4a, right plot) was attributed to AlCl$_4^-$ intercalation of graphite. The reduction wave range of about 1.16 to about 2.36 V (vs. Al) was assigned to the AlCl$_4^-$ de-intercalation. The nature of the shoulder in the reduction curve of graphite ranging from about 2.36 to about 1.9 V (FIG. 4a, right plot) and a higher discharge plateau (about 2.25 to about 2.0 V) of an Al/PG cell upon charging (FIG. 2b) may be due to different stages of anion-graphite intercalation.

It is proposed that the following simplified cathode redox reactions during charging and discharging occur as

$$C_n + AlCl_4^- \rightleftarrows C_n[AlCl_4] + e^- \qquad (2)$$

where n is the mole ratio of carbon atom/anion in the intercalated graphite. Under an optimal electrolyte with AlCl$_3$/[EMIm]Cl of about 1.3 (by mole), the Lewis acidity was relatively high and the AlCl$_4^-$ concentration was about 2.3-fold higher than Al$_2$Cl$_7^-$ specified by

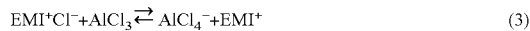
$$EMI^+Cl^- + AlCl_3 \rightleftarrows AlCl_4^- + EMI^+ \qquad (3)$$

$$EMI^+ + AlCl_4^- + AlCl_3 \rightleftarrows Al_2Cl_7^- + EMI^+ \qquad (4)$$

The balanced AlCl$_4^-$ and Al$_2$Cl$_7^-$ concentrations in the electrolyte favored an optimal charging capacity of the cathode with abundant AlCl$_4^-$ for charging/intercalation on graphite (Eq. 2) and sufficient Al$_2$Cl$_7^-$ concentration for charging/electrodeposition on the anode (Eq. 1). During cell discharge, the local anion concentration near the anode side reduced (Eq. 1, AlCl$_4^-$ ions were converted to fewer Al$_2$Cl$_7^-$ ions) while EMI$^+$ ions migrated to the cathode side, accompanied by more AlCl$_4^-$ anions released (Eq. 2) from the graphite layers to the cathode surrounding (FIG. 2a). These processes maintained local charge neutrality on both electrodes.

Ex situ XRD measurement of graphite foil (FIG. 4b, see Materials and Methods) confirmed graphite intercalation/de-intercalation by chloroaluminate anions during charge/discharge. The sharp pristine graphite foil (002) peak at 2θ=about 26.55° (d-space=about 3.35 Å) (FIG. 4b) substantially vanished upon charging to a specific capacity of about 30 mAh g$^{-1}$, while two new peaks appeared at about 28.25° (d of about 3.15 Å) and about 23.56° (d of about 3.77 Å) (FIG. 4b), with peak intensities further increased upon fully charging to about 62 mAh g$^{-1}$. The doublet XRD peak indicated highly strained graphene stacks upon anion intercalation. Analysis of peak separation indicated a stage 4 graphite intercalation compound with an intercalant gallery height of about 5.7 Å and a gallery expansion of about 2.35 Å, indicating the AlCl$_4^-$ anions (size of about 5.28 Å) were intercalated in the space between graphene layers in a distorted state. De-intercalation upon fully discharging led to recovery of the graphite peak but with a broad shoulder (FIG. 4b) likely caused by irreversible changes in the stacking between the graphene layers or a small amount of trapped species.

Figure 15:
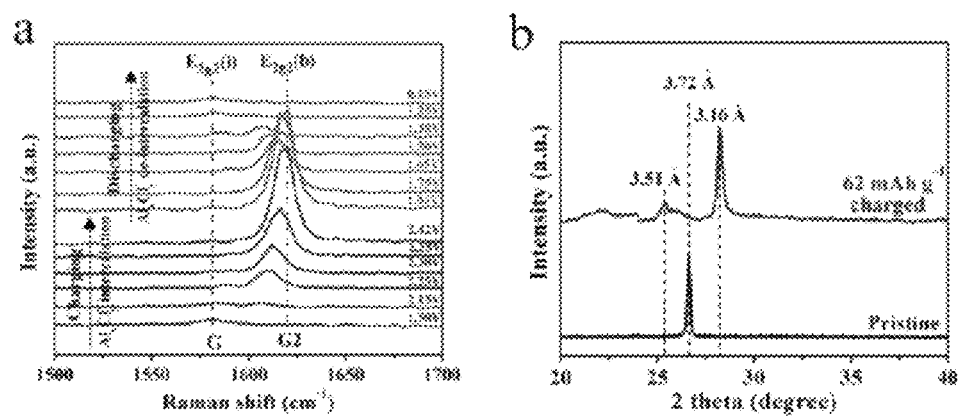
FIG. 15: Reaction mechanism of graphitic cathodes. a, In situ Raman spectra recorded for the 3D graphite cathode through a charge/discharge cycle showing chloroaluminate anion intercalation/de-intercalation into graphite. b, Ex situ X-ray diffraction patterns of the pristine and fully charged (about 62 mAh g$^{-1}$) 3D graphite foam.

In situ Raman spectroscopy is performed to probe chloroaluminate anions intercalation/de-intercalation into graphite during cell charge/discharge (FIG. 4c). The graphite G-band at about 1584 cm$^{-1}$ was observed to diminish and split into a doublet [about 1587 cm$^{-1}$ for E$_{2g2}$(i) mode and about 1608 cm$^{-1}$ for E$_{2g2}$(b) mode] upon anion intercalation (FIG. 4c), and then evolved into a sharp new Raman peak at about 1636 cm$^{-1}$ (G2 band of E$_{2g2}$(b) mode) (spectrum of about 2.41 V, FIG. 4c) upon fully charging. The spectral changes were reversed upon de-intercalation (FIG. 4c), recovering the typical graphite Raman G band (about 1584 cm$^{-1}$) when fully discharged (spectrum of about 0.03V, FIG. 4c). Similar Raman spectra and XRD data were obtained with 3D graphite foam cathode (FIG. 15a,b). Interestingly, a white aluminum oxide foam was obtained after calcination of a fully charged pyrolytic graphite (PG) foil at about 850° C. in air (FIG. 4d), indicating intercalation of chloroaluminate anions through the graphite foil thickness, and transformation into an Al oxide foam upon oxidative removal of the carbon network.

X-ray photoelectron spectroscopy (XPS) and Auger electron spectroscopy (AES) also are performed to probe the chemical nature of the intercalated species in the graphitic cathodes (see Materials and Methods). To reduce trapped electrolyte, 3D graphite foam is used for this investigation and is thoroughly washed by anhydrous methanol. XPS revealed that upon charging pristine graphite, the about 284.8 eV C1s peak split to exhibit a shoulder peak at a higher energy of about 285.9 eV (FIG. 5a), confirming electrochemical oxidation of graphitic carbon due to intercalation of AlCl$_4^-$ anions (see Eq. 2). Chloroaluminate intercalation was also evident from the appearance of Al 2p and Cl 2p peaks observed over the graphite sample (FIG. 5b,c). Upon discharging the C1s XPS spectrum of the cathode recovered to the pristine graphite case due to anion de-intercalation and carbon reduction (FIG. 5a), accompanied by a substantial reduction in the Al 2p and Cl 2p signals recorded over the graphite sample (See FIG. 5b,c). The remaining Al and Cl signals observed were attributed to trapped/adsorbed species in the graphite sample probed by XPS over a large area. Further, high spatial resolution AES elemental mapping of a single graphite whisker in the fully charged 3D graphite foam revealed Al and Cl Auger signals uniformly distributed over the graphitic whisker (FIG. 5d,e), again confirming chloroaluminate anion intercalation. When fully discharged, AES mapping revealed anions de-intercalation from graphite with much lower Al and Cl Auger signals observed (FIG. 5f,g). These spectroscopy results revealed chloroaluminate ion intercalation/de-intercalation in graphite redox reactions are involved in the rechargeable Al cell.

The Al battery was found to be mechanically bendable and foldable (FIG. 16) owing to the flexibility of the electrode and separator materials, which can be another desirable feature of the battery. Further, Al battery pouch cells were drilled through during battery operation, and no safety hazard was observed owing to the lack of flammability of ionic liquid electrolyte in air. Taken together, an improved Al-ion battery was developed using improved graphitic cathode materials with stable cycling life up to 7,500 charge/discharge cycles, or more, without noticeable decay at ultra-high current densities. The Al-graphite battery can afford an energy density of about 40 Wh kg$^{-1}$ or more (comparable to lead-acid and Ni-MH batteries) and a high power density up to about 3,000 W kg$^{-1}$ or more (similar to supercapacitors). The energy/power densities were calculated based on the about 65 mAh g$^{-1}$ cathode capacity and the mass of active materials in electrodes and electrolyte. Rechargeable Al batteries have advantages of low cost, high-safety, long lasting without noticeable decay, high rate/power, and mechanical flexibility.

Materials and Methods

Preparation of Ionic Liquid Electrolytes.

A room temperature ionic liquid electrolyte was made by mixing 1-ethyl-3-methylimidazolium chloride ([EMIm]Cl, 97%, Acros Chemicals) and anhydrous aluminum chloride (AlCl$_3$, 99.999%, Sigma Aldrich). [EMIm]Cl was baked at about 130° C. under vacuum for about 16-32 hours to remove residual water. ([EMIm]Al$_x$Cl$_y$) ionic liquid electrolytes were prepared in an argon-atmosphere glove box (both [EMIm]Cl and AlCl$_3$ are highly hygroscopic) by mixing anhydrous AlCl$_3$ with [EMIm]Cl, and the resulting light-yellow, transparent liquid was stirred at room temperature for about 10 minutes. The mole ratio of AlCl$_3$ to [EMIm]Cl was varied from about 1.1 to about 1.8. The water content of the ionic liquid was determined (about 500-700 ppm) using a coulometric Karl Fischer titrator, DL 39 (MettlerToledo). The predominant anions in basic melts (AlCl$_3$/[EMIm]Cl mole ratio<1) are Cl$^-$ and AlCl$_4^-$, while in acidic melts (AlCl$_3$/[EMIm]Cl mole ratio>1) chloroaluminate anions such as Al$_2$Cl$_7^-$, Al$_3$Cl$_{10}^-$, and Al$_4$Cl$_{13}^-$ are formed. The ratio of anions to cations in the AlCl$_3$/[EMIm]Cl electrolyte was determined using a glass filterpaper (Whatman GF/D) loaded with an about 4-8 μm Au-coated SiO$_2$ bead in a cuvette cell (0.35 mL, Starna Cells) with random orientation quartz windows. Then, in the glove box, the cuvette cell was filled with AlCl$_3$/[EMIm]Cl=about 1.3 (by mole). Raman spectra (200 to 650 cm$^{-1}$) were obtained using a 785-nm laser with 2 cm$^{-1}$ resolution. Raman data were collected from the surface of the Au-coated SiO$_2$ bead to benefit from surface enhanced Raman (FIG. 7).

Preparation of 3D Graphite Foam.

Nickel foams (Alantum Advanced Technology Materials (Shenyang, China)) were used as 3D scaffold templates for the CVD growth of 3D graphite. The nickel foams were heated to about 1000° C. in a horizontal tube furnace (Lindberg Blue M, TF55030C) under Ar (about 500 sccm) and H$_2$ (about 200 sccm) and annealed for about 10 min to clean their surfaces and to eliminate a thin surface oxide layer. Then, CH$_4$ was introduced into the reaction tube at ambient pressure at a flow rate of about 10 sccm, corresponding to a concentration of about 1.4 vol. % in the total gas flow. After about 10 minutes of reaction gas mixture flow, the samples were rapidly cooled to room temperature at a rate of about 300° C. min$^{-1}$ under Ar (about 500 sccm) and H$_2$ (about 200 sccm). The Ni foams covered with graphite were drop-coated with a poly(methyl methacrylate) (PMMA) solution (about 4.5% in ethyl acetate), and then baked at about 110° C. for about 0.5 hours. The PMMA/graphene/Ni foam structure was obtained after solidification. Afterwards, these samples were put into an about 3 M HCl solution for about 3 hours to substantially completely dissolve the Ni foam to obtain the PMMA/graphite at about 80° C. Finally, the pure 3D graphite was obtained by removing PMMA in hot acetone at about 55° C. and annealing in NH$_3$ (about 80 sccm) at about 600° C. for about 2 hours, and then annealing in air at about 450° C. for about 2 hours. The microstructure of 3D graphite was examined by SEM analysis using a FEI XL30 Sirion scanning electron microscope (FIG. 3a).

Preparation of Glassy Carbon (GC).

GC was used as the current collector in the Swagelok-type cell. About 72 g phenol (Sigma-Aldrich) and about 4.5 mL ammonium hydroxide (30%, Fisher Scientific) were dissolved in about 100 mL formaldehyde solution (37%, Fisher Scientific) under reflux while stirring rapidly. The solution was stirred at about 90° C. until the solution turned a milk-white color. Rotary evaporation was used to remove the water and get the phenolic resin. The phenolic resin was solidified at about 100° C. in a mold (½ inch glass tube), and then carbonized at about 850° C. under Ar atmosphere for about four hours to obtain the glassy carbon rod. The resulting GC rod contributed negligible capacity to the cathode.

Electrochemical Measurements.

Figure 12:
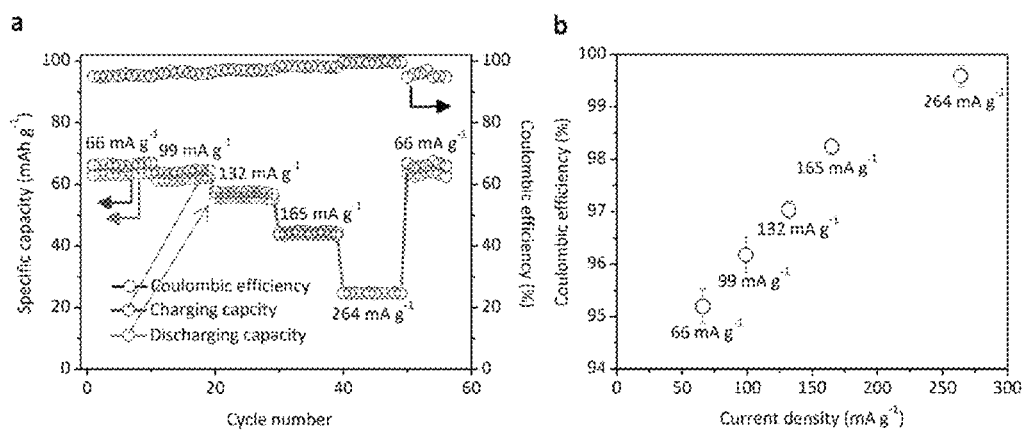
FIG. 12: C-rate capability of Al/pyrolytic graphite cell. a, Capacity retention of a Al/pyrolytic graphite cell cycled at various current densities, showing good cycling stability at different charge-discharge current densities. b, Coulombic efficiency versus current density data of Al/PG cells, indicating the Coulombic efficiency is about 95-97% at current densities of about 66-132 mA g$^{-1}$. All electrochemical studies were performed in AlCl$_3$/[EMIm]Cl=about 1.3 (by mole) ionic liquid electrolyte in a Swagelok-type cell.

Prior to assembling the Al/graphite cell in the glove box, all components were heated under vacuum at about 60° C. for over about 12 hours to remove residual water. All electrochemical tests were performed at 25±1° C. A Swagelok-type cell (½ inch diameter) was constructed using an about 4 mg pyrolytic graphite (PG) foil (0.017 mm, Suzhou Dasen Electronics Materials) cathode and an about 90 mg aluminum foil (0.25 mm, Alfa Aesar) anode. A ½ inch glassy carbon (GC) rod (10 mm) was used as the current collector for the PG cathode, and a ½ inch graphite rod (10 mm) was used for the Al anode. Six layers of ½ inch glass filter paper (Whatman 934-AH) were placed between the anode and cathode. Then, about 1.0 mL of ionic liquid electrolyte (prepared with AlCl$_3$/[EMIm]Cl mole ratios of about 1.1, about 1.3, about 1.5 and about 1.8) was injected and the cell sealed. The Al/PG cell was then charged (to about 2.45 V) and discharged (to about 0.01 V) at a current density of about 66 mA g$^{-1}$ with a MTI battery analyzer (BST8-WA) to identify the ideal AlCl$_3$/[EMIm]Cl mole ratio (FIG. 7). To investigate the Coulombic efficiency of Al/PG cell in AlCl$_3$/[EMIm]Cl of about 1.3 (by mole) electrolyte, the cell were charged to about 2.45, about 2.50, about 2.55, and about 2.60 V, respectively, and discharged to about 0.4 V at a current density of about 66 mA g$^{-1}$ (FIG. 11a). For long-term cycling stability tests, an Al/PG cell using an electrolyte with AlCl$_3$/[EMIm]Cl of about 1.3 by mole was charged/discharged at a current density of 66 mA g$^{-1}$ (FIG. 2b,c). To study the C-rate capability of Al/PG cell, the current densities were varied from about 66 to about 264 mA g$^{-1}$ (FIG. 12). The electrolyte amount was lowered to about 0.02 mL per mg of cathode material, and similar cell operation was observed (FIG. 9). Further decrease in the electrolyte amount is possible through battery cell engineering.

Pyrolytic graphite foil was synthesized by pyrolysis of polyimide at high temperature, in which some covalent bonding is generated. Natural graphite foil was produced by compressing expanded graphite flakes, leading to stacking of natural graphite flakes by Van der Waals bonding in-between. Similar battery characteristics were observed with pyrolitic graphite and graphite foil electrodes, indicating that the battery behavior was derived from the graphitic property of the electrodes (FIG. 13c). However, since the natural graphite foils are synthesized by compressing expanded natural graphite powders without covalent linkage in-between, these foils can exhibit drastic electrode expansion noticeable to the naked eye, while pyrolytic graphite foils showed no noticeable electrode expansion due to covalency (FIG. 13a, b).

Figure 14:
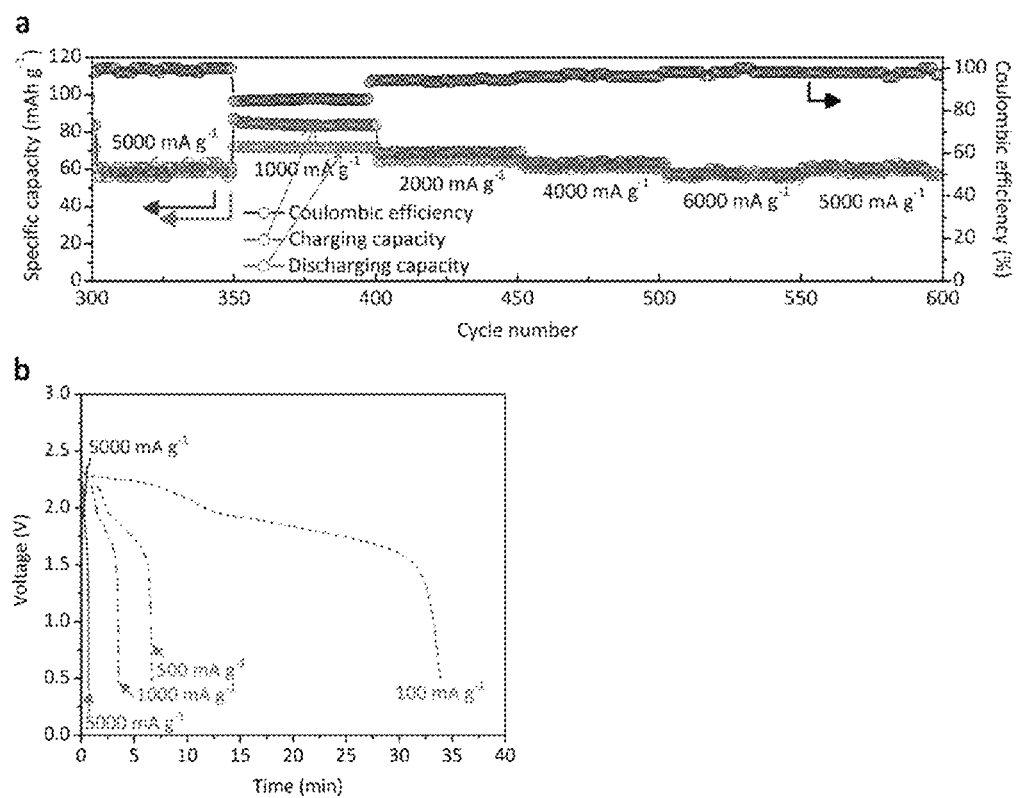
FIG. 14: C-rate capability of Al/3D graphite cell. a, Capacity retention of Al/3D graphite cell cycled at various current densities, showing stable cycling stability at different charge-discharge current densities. All electrochemical studies were performed in AlCl$_3$/[EMIm]Cl=about 1.3 (by mole) ionic liquid electrolyte in a pouch cell. b, Galvanostatic charge and discharge curves of Al/3D graphite cells charging at about 5,000 mA g$^{-1}$ and discharging at various current densities ranging from about 100 to about 5,000 mA g$^{-1}$. The electrochemical studies were performed in AlCl$_3$/[EMIm]Cl=about 1.3 (by mole) ionic liquid electrolyte in a pouch cell.

Pouch cells were assembled in the glove box using a 3D graphite foam (about 3 mg) cathode and an Al foil (about 70 mg) anode, which were separated by two layers of glass filter paper to prevent shorting. Nickel foils (0.09×3×60 mm$^3$ in size) were used as current collectors for both anode and cathode. The electrolyte (about 2 mL prepared using AlCl$_3$/[EMIm]Cl=about 1.3 by mole) was injected and the cell was closed using a heat sealer. The cell was removed from the glove box for long-term cycling stability tests, in which the cell was charged/discharged at a current density of 4,000 mA g$^{-1}$ (FIG. 3b,c). To determine the C-rate capability and fast-charge/slow-discharge behaviors of Al/3D graphite cell, various current densities from about 100 to about 5,000 mA g$^{-1}$ were used (FIG. 14 and FIG. 3d). The pouch cell was charged to about 2.42 V and discharged to a cut-off voltage of about 0.5 V to mitigate against the dissolution reaction of Ni foil in the ionic liquid electrolyte.

Cyclic voltammetry (CV) measurements were performed using a potentiostat/galvanostat model CHI 760D (CH Instrument) in three-electrode mode. The working electrode was an Al foil or a PG foil, the auxiliary electrode included an Al foil, and an Al foil was used as the reference electrode.

Copper tape was attached to these electrodes as the current collector. All three electrodes were placed in a plastic (1.5 mL) cuvette cell (containing electrolyte $AlCl_3$/[EMIm]Cl=about 1.3 by mole) in the glove box, which was then sealed with a rubber cap using a clamp. The scanning voltage range was set from about −1.0 to about 1.0 V (vs. Al) for Al foil and about 0 to about 2.5 V (vs. Al) for graphitic material, and the scan rate was about 10 mV s$^{-1}$ (FIG. 4a). To investigate the working voltage range of the electrolyte without involving cathode intercalation, two-electrode measurement was performed by using GC rod cathode against Al anode in a Swagelok cell in $AlCl_3$/[EMIm]Cl (about 1.3 by mole) electrolyte. The scanning voltage range was set from 0 to 2.9 V at a scan rate of 10 mV s$^{-1}$ (FIG. 11b).

Figure 16:
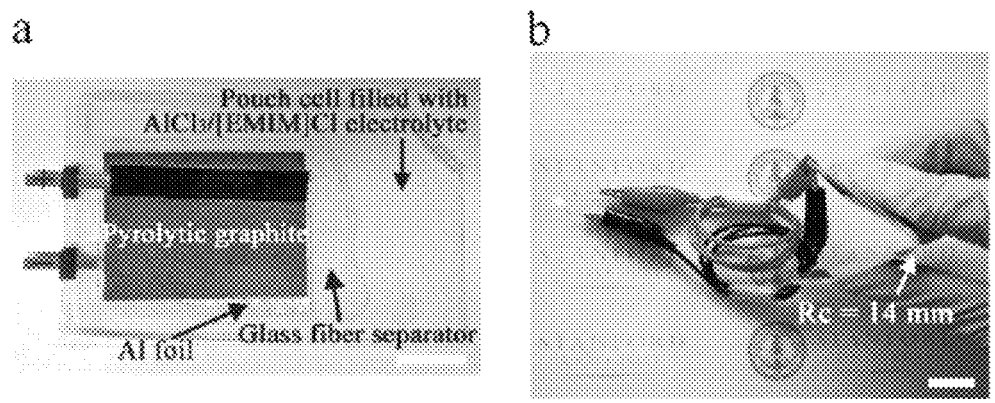
FIG. 16: Flexible Al-graphite battery. a, Photograph of a fully assembled Al/pyrolytic graphite cell in a pouch cell configuration. b, Photograph of a severely bent or folded Al/pyrolytic graphite cell powering a red LED. The radius of curvature ($R_c$) of bending is about 14 mm. Scale bars equal 2 cm.

To demonstrate the high flexibility of the Al/graphitic cell, a pouch cell was assembled in the glove box by sandwiching a glass filter paper between a thin Al foil anode (about 20-50 mg) and a pyrolytic graphite foil (about 20-30 mg) cathode with a suitable amount (about 0.05 mL per mg of graphite foil) of ionic liquid electrolyte ($AlCl_3$/[EMIm]Cl=about 1.3 by mole). The Al-graphite cell was capable of powering a red LED light under both non-bending and bending conditions (FIG. 16). As part of the stability test, a metallic drill penetration test was performed using a fully charged Al/PG cell connected with a red LED. The working voltage of the Al/PG cell was about 1.7 V. A sharp stainless steel drill was driven into the center of the cell body at a constant speed.

Ex-Situ X-Ray Diffraction and In-Situ Raman Spectroscopy Studies of Graphite Cathode During Charge and Discharge.

For ex-situ X-ray diffraction (XRD) study, an Al/graphitic materials (PG) cell (in a Swagelok configuration) was charged and discharged at a constant current density of about 66 mA g$^{-1}$. The reactions were stopped after 30 mAh g$^{-1}$ charged, fully charged (about 62 mAh g$^{-1}$), and about 40 mAh g$^{-1}$ discharged capacities after charge/discharge capacities were in a stable state. The fully charged (about 62 mAh g$^{-1}$) 3D graphite was also prepared. After either charge or discharge reaction, the graphitic cathode was removed from the cell in the glove box. To avoid the reaction between the cathode and air/moisture in the ambient atmosphere, the cathode was placed onto a glass slide and then wrapped in a Scotch tape. The wrapped samples were immediately removed from the glove box for ex-situ XRD measurement, which were performed on a PANalyticalX'Pert instrument (FIG. 4b and FIG. 15b).

During the charging/anion-intercalation process, the graphite (002) peak substantially completely vanished and two new peaks arose. The intensity pattern is an example for a stage n GIC, where the most dominant peak is the (00n+1) and the second most dominant peak is the (00n+2). By increasing the charging state from about 48-60% charged (about 30 mAh g$^{-1}$) to the fully charged state (about 62 mAh g$^{-1}$), the distance between the (00n+1) and (00n+2) peaks gradually increased, as more $Al_xCl_y^-$ anions intercalated. By determining the ratio of the d(n+2)/d(n+1) peak position and correlating these to the ratios of stage pure GICs, the most dominant stage phase of the observed GIC can be assigned. After assigning the (00l) indices, the periodic repeat distance (k), the intercalant gallery height (di) and the gallery expansion (Ad) can be calculated using $$I_c = di + 3.35 \text{ Å} \cdot (n-1) = \Delta d + 3.35 \text{ Å} \cdot n = l \cdot d_{obs} \quad [1]$$

where l is the index of (00l) planes oriented in the stacking direction, and $d_{obs}$ is the observed value of the spacing between two adjacent planes.

For the simultaneous use of in-situ Raman and galvanostatic charge/discharge reaction measurements, a cuvette cell (0.35 mL, Starna Cells) with random orientation quartz windows was used. An aluminum foil and a graphitic material (PG or 3D graphite) were used as the anode and cathode, respectively. The electrolyte was mixed $AlCl_3$/[EMIm]Cl=about 1.3 (by mole). The electrochemical cell was assembled in the glove box following the process mentioned above. Raman spectra were obtained (1500-1700 cm$^{-1}$) using a HeNe laser (633 nm) with 2 cm$^{-1}$ resolution. The spectral data were collected after a few successive charge/discharge scans between about 2.45 to about 0.01 V at a current density of about 66 mA g$^{-1}$ (PG) (FIG. 4c) or about 1,000 mA g$^{-1}$ (3D graphite) (FIG. 15a).

X-Ray Photoelectron Spectra (XPS) and Auger Electron Spectroscopy (AES) Measurements.

Figure 5:
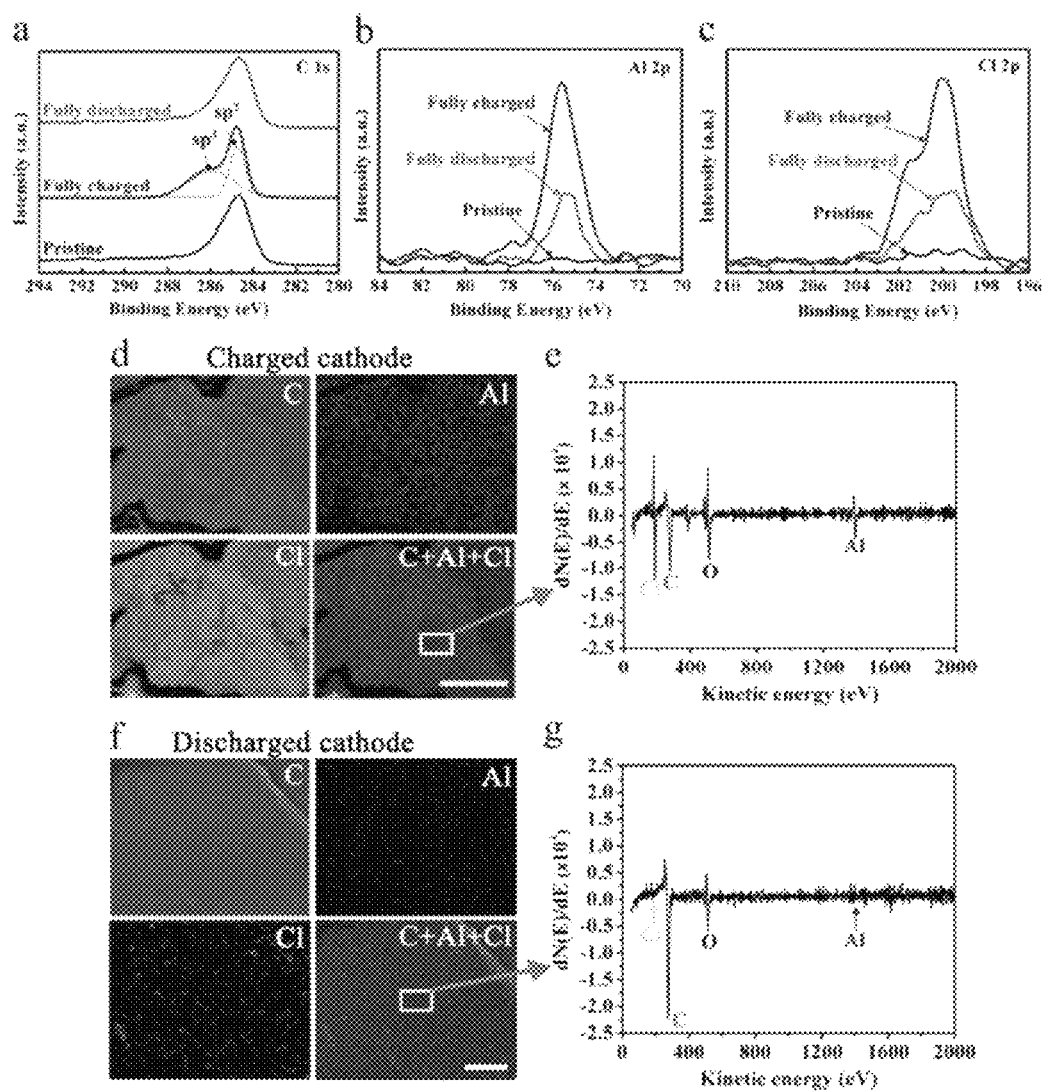
FIG. 5: Chemical probing of graphitic cathode by X-ray photoelectron spectroscopy (XPS) and Auger electron spectroscopy (AES). a, XPS data of the C 1s peak of pristine 3D graphite, fully charged and fully discharged 3D graphite, showing graphite was in an oxidized state when fully charged. b,c, XPS data of Al 2p and Cl 2p peaks observed with a fully charged graphite sample. The intensities of Al 2p and Cl 2p peak intensities decreased in fully discharged state, and the remaining signals were attributed to residual trapped electrolyte in the sample. d, AES mapping images for C, Al and Cl elements, obtained with a fully charged graphite sample. The uniformly distributed signals and excellent signal overlay of C, Al and Cl indicated intercalation of Al$_x$Cl$_y^-$ anions into graphite upon charging. e, An AES spectrum recorded over an area in d marked by the white box, showing the co-existence of Cl, C, O and Al signals. f, AES mapping images for C, Al and Cl elements obtained with a fully discharged graphite sample in an area marked by the white box. Small Al and Cl signals were seen in the discharged sample. g, An AES spectrum recorded over the boxed area in f with the discharged sample, showing mainly C and O signals with small Al and Cl signals in the discharged sample. The scale bars in d and f are 25 μm and 10 μm, respectively.

Al/3D graphite cells were fully charged/discharged at a current density of about 4,000 mA g$^{-1}$. Then, the Al/3D graphite cells were transferred to the glove box for preparation for XPS and AES analysis. Fully charged/discharged 3D graphite foams were collected from the pouch cell and washed with anhydrous methanol to remove the residual $AlCl_3$/EMIC ionic liquid electrolyte. The as-rinsed 3D graphite foams were attached to a Si wafer and baked at about 90° C. for about 10 minutes to remove residual methanol. The samples were sealed in a plastic pouch to avoid contamination by reaction with moisture and oxygen prior to XPS and AES characterization. Auger electron spectra were taken by PHI 700 Scanning Auger Nanoprobe operating at 10 kV and 10 nA. XPS spectra were collected on a PHI VersaProbe Scanning XPS Microprobe (FIG. 5).

TGA Measurements.

Fully charged PG cathodes were washed with methanol for about 24 hours to remove the residual $AlCl_3$/EMIC ionic liquid electrolyte. The as-washed PG samples were calcined at about 850° C. for about 3 hours in air. The as-calcined samples (white foam) were collected, weighed, and analyzed by SEM-EDX to study the chemical composition (FIG. 4d). SEM and SEM-EDX analyses were performed using a FEI XL30 Sirion scanning electron microscope.

Example 2

Expanded Pyrolytic Graphite for Ultra-Fast Cathode

Figure 17:
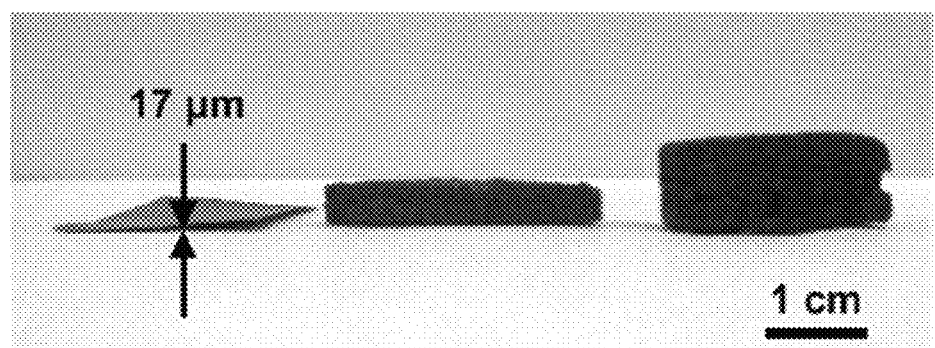
FIG. 17: From left to right: PG, expanded PG by rapid thermal heating after intercalation, and secondary expanded PG by hydrogen evolution reaction.

Al batteries were constructed in pouch cells, using an aluminum foil (thickness of about 15-250 μm) anode and pyrolytic graphite (PG) foil (about 17 μm) cathode, in an $AlCl_3$/1-ethyl-3-methylimidazolium chloride ([EMIm]Cl) ionic liquid electrolyte (residual water of about 400 ppm). The Al/PG cell was then charged under a constant voltage at about 2.5 V for about 24 h. The cathode PG was taken out of the pouch after charge and washed by ethanol and water to remove the residual ionic liquid electrolyte. The PG foil was expanded by rapid thermal heating after intercalation/charging in the Al ion cell and then electrochemical hydrogen evolution reaction in a basic solution (about 10 M NaOH, with saturated sodium acetate (NaAc)) (FIG. 17). The hydrogen gas evolved further expanded the material into a highly porous structure while maintaining electrical connectivity (from about 17 μm to about 1 cm). The secondary expanded PG was washed with deionized water repetitively to remove the NaOH or NaAc residual and lyophilized. The expanded PG was highly porous and can be used to make ultrafast cathode for Al batteries.

Example 3

Pouch Cell with Expanded PG Operating Under Constant Voltage Charging

Figure 18:
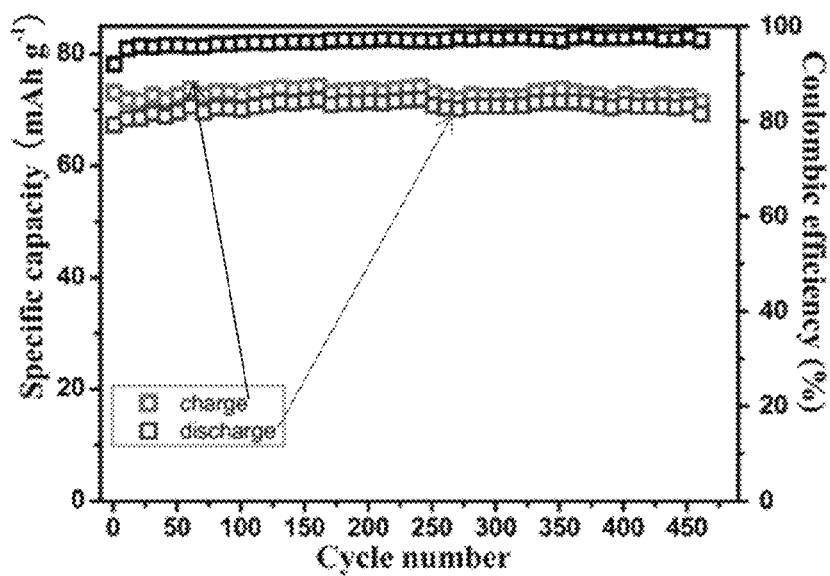
FIG. 18: Long-term stability test of Al/pyrolytic graphite cell, constant voltage charge at about 2.45 V for about 1 h, and discharged (to about 0.5 V) at a current density of about 66 mA g$^{-1}$.

Pouch cells were assembled in the glove box using PG (about 57 mg) cathode and an Al foil anode, which were separated by two layers of glass filter paper to prevent shorting. Carbon Fiber paper (CFP) was used as back contact of the PG with Ni bar as current collector for the cathode, and Ni bar was used as current collector for the anode. The electrolyte (about 2.8 g prepared using $AlCl_3$/[EMIm]Cl=about 1.3 by mole) was injected, and the cell was sealed upon heating. The Al/PG cell was then charged under a constant voltage at about 2.45 V for about 1 h, and discharged (to about 0.5 V) at a current density of about 66 mA $g^{-1}$, showing good capacity and high stability (FIG. 18).

Example 4

Electrochemical Drying of Water from Battery

Pouch cells were assembled in the glove box using an aluminum foil (thickness of about 15-250 µm) anode and pyrolytic graphite (PG) foil cathode, which were separated by two layers of glass filter paper. The pre-dried electrolyte (residual water of about 400 ppm, prepared using $AlCl_3$/[EMIm]Cl=about 1.3 by mole) was injected, and the cell was closed using a heat sealer. The Al/PG cell was then charged (to about 2.45 V) and discharged (to about 0.5 V) at a current density of about 66 mA $g^{-1}$. The $H_2$ gas from the hydrogen evolution reaction of the residual water filled the pouch after several cycles. The pouch was then punctured by a needle to release the gas and re-sealed. This was repeated until the pouch cell did not inflate any more after three times of the gas releasing. It is proposed that the residual water in the electrolyte was consumed by decomposition into $H_2$ gas electrochemically during battery charging, providing a way to electrochemically dry the battery electrolyte to a high degree.

Example 5

This example describes an improved Al-ion battery system using a flexible graphite foil as a cathode combined with a flexible aluminum anode in a non-flammable ionic liquid electrolyte of $AlCl_3$-[EMIm]Cl with an optimal composition. The Al/graphite battery (Al/GF battery) shows a discharge plateau ranging from about 2.25 V to about 1.5 V and delivers a specific capacity up to about 127 mAh $g^{-1}$, or more, based on the mass of the graphite foil cathode. Intercalation and de-intercalation processes of anions of the ionic liquid in the graphite cathode were investigated, revealing a large expansion of graphite interlayer spacing due to electrochemical intercalation of $Al_xCl_y^-$ anions. The charge-discharge cycling stability of the Al/GF battery shows an about 100% capacity retention over at least 300 cycles with a Coulombic efficiency of about 98-100%. The Al/graphite battery with high cost-effectiveness, safety and high voltage represents an improved energy storage system.

Components in Al/Graphite Battery.

Through systematic investigation of full battery characteristics, identification was made of aluminum foil (thickness of about 15-250 µm) as a desirable anode, graphite foil as a desirable cathode among different forms of carbon materials including, for example, graphite foil (GF), carbon fiber paper (CFP), carbon black (CB) films, and various forms of graphitic materials, and an optimal ionic liquid electrolyte with $AlCl_3$/[EMIm]Cl molar ratio of about 1.3 (e.g., greater than about 1.1). The cathode material is varied, and the Al/GF cells are tested under slow charge/discharge current density of about 6.6 mA $g^{-1}$ (about C/10) to maximize the specific capacity. Al/GF cell exhibited significantly higher specific capacity (about 74 mAh $g^{-1}$) than Al/CFP (about 27 mAh $g^{-1}$) and Al/CB (about 36 mAh $g^{-1}$) cells but with similar voltage plateaus at about 2.25-1.5 V (See FIG. 19a). The higher capacity might be derived from the high conductivity and structural connectivity of GF and the large interlayer distances of the graphitic layered structure compared to the limited spacing of non-graphitic structures, such as CFP and CB. In the anode side, metallic Al could be deposited from an $AlCl_3$-[EMIm]Cl ionic liquid electrolyte (when the molar ratio of $AlCl_3$ to [EMIm]Cl is larger than 1).

Figure 19:
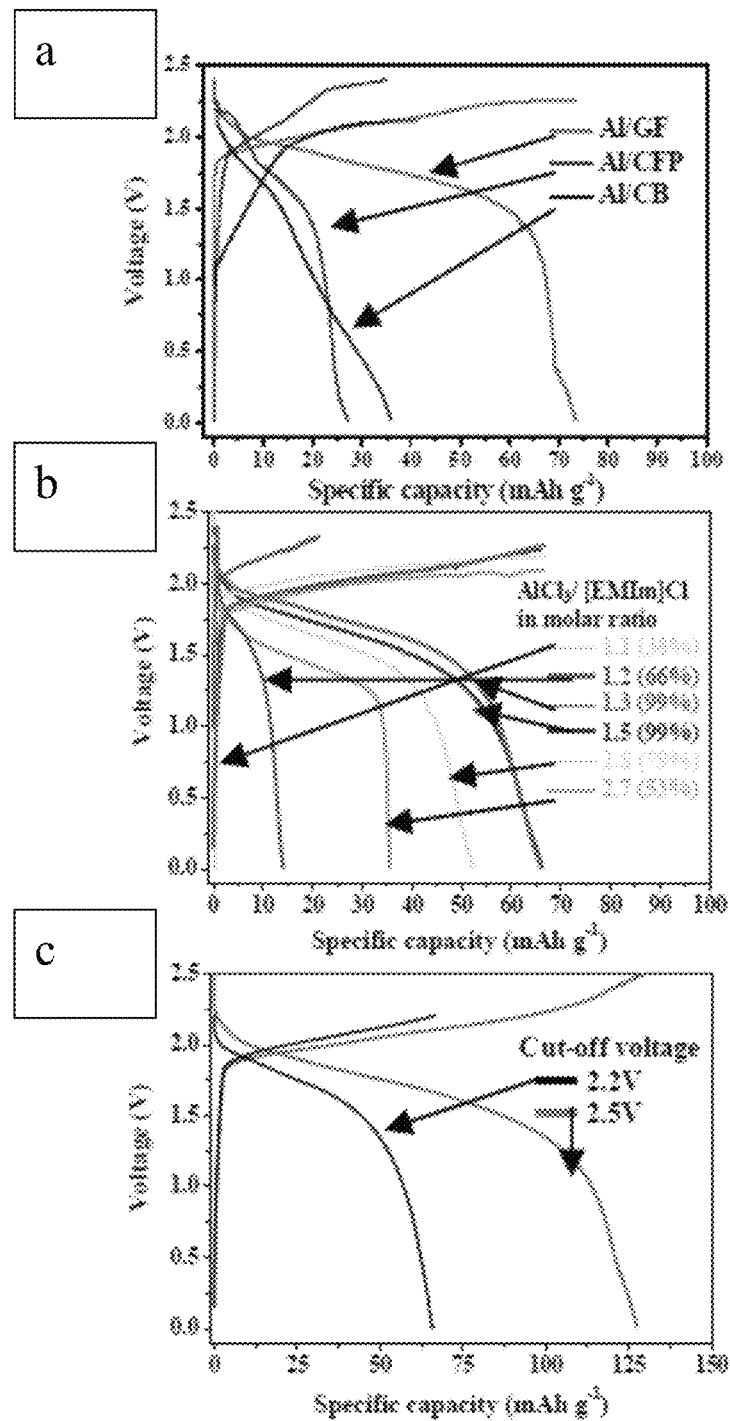
FIG. 19: a, Galvanostatic charge and discharge curves of graphite foil (GF), carbon fiber paper (CFP), and carbon black (CB) at a current density of about 6.6 mA g$^{-1}$ in about 1.3:1 AlCl$_3$:[EMIm]Cl electrolyte. An aluminum foil was used as anode material. The Al/GF cell presented a three-times higher specific capacity than Al/CFP and Al/CB cells. b, Galvanostatic charge and discharge curves of Al/GF battery at a current density of about 33 mA g$^{-1}$ in various molar ratios of AlCl$_3$/[EMIm]Cl ionic liquid electrolytes. c, Galvanostatic charge and discharge curves of Al/GF battery at different cut-off voltages. All galvanostatic tests were performed in a two-electrode configuration.

The Al-ion battery performance depended on the composition of the electrolyte and identifying an optimal composition of $AlCl_3$-[EMIm]Cl ionic liquid electrolyte is a desirable for a rechargeable Al-ion battery with high performance. Charge/discharge characteristics of an Al/GF cell were studied in various molar ratios of $AlCl_3$ to [EMIm]Cl (from about 1.1 to about 2.7) for optimization, as indicated in FIG. 19b. In the $AlCl_3$/[EMIm]Cl ionic liquid electrolyte of molar ratio of about 1.1, the Al/GF cell could not be charged and discharged reversibly (see FIG. 19b), which was caused by the absence of, or low, $Al_2Cl_7^-$ anion content in the about 1.1 $AlCl_3$/[EMIm]Cl ratio case. The $Al_2Cl_7^-$ anion is the main ionic species for Al electrodeposition during the charging process. The lack of $Al_2Cl_7^-$ would cause the incapability of charging the Al/GF cell under low $Al_2Cl_7$ concentration. Other attempts previously used very low $AlCl_3$/[EMIm]Cl and $AlCl_3$/[bbim]Br ratios of 1.1-1.2 and 0.5, respectively, for Al batteries, a condition found by this example to be undesirable for Al re-charging in some embodiments. Importantly, the capacity of the Al/GF battery dramatically increased when the molar ratio of $AlCl_3$/[EMIm]Cl slightly increased from about 1.2 to about 1.3 (FIG. 19b), and then decreased when the molar ratio of $AlCl_3$/[EMIm]Cl was larger than about 1.5 (see FIG. 19b). Thus, an optimal ratio of $AlCl_3$/[EMIm]Cl of about 1.3-1.5 in the ionic liquid electrolyte was identified.

An optimal $AlCl_4^-$ and $Al_2Cl_7^-$ ion ratio under a specific $AlCl_3$ to [EMIm]Cl ratio could give rise to a maximized battery capacity by balancing the ions involved in electrochemical reactions involving $AlCl_4^-/Al_2Cl_7^-$ intercalation into graphite in the cathode and $Al_2Cl_7^-$ reduction to Al on the anode. The Al/GF battery exhibited a highest specific capacity up to about 47 mAh $g^{-1}$ or more at a discharge voltage cut-off of about 1.5 V in $AlCl_3$/[EMIm]Cl electrolyte of molar ratio of about 1.3-1.5 (FIG. 19b), when the ratio of $AlCl_4^-$ to $Al_2Cl_7^-$ was in the range of about 2.33-1. A balanced concentration of $AlCl_4^-$ to $Al_2Cl_7^-$ could facilitate redox reactions on both electrodes. Furthermore, the Al/GF battery in $AlCl_3$/[EMIm]Cl (about 1.3 in molar ratio) showed a discharge plateau in a high voltage range of about 2.25 V to about 1.5 V. To further increase specific capacity of the Al/GF battery, a higher cut-off charging voltage (about 2.5 V) was set. The specific capacity was increased from about 66 mAh $g^{-1}$ (about 2.2 V) to about 127 mAh $g^{-1}$ (about 2.5 V) (FIG. 19c). High charging voltages or longer charging times were found to increase the discharge capacity, which was attributed to increased intercalation of GF by Al—Cl anions and gradual increase in the expansion of graphite. However, it might involve side reaction during charging of the Al/GF battery at a relatively higher cut-off voltage (e.g., about 2.5 V) to result in a lower Coulombic efficiency.

Cycling Properties of Al/Graphite Battery.

Figure 20:
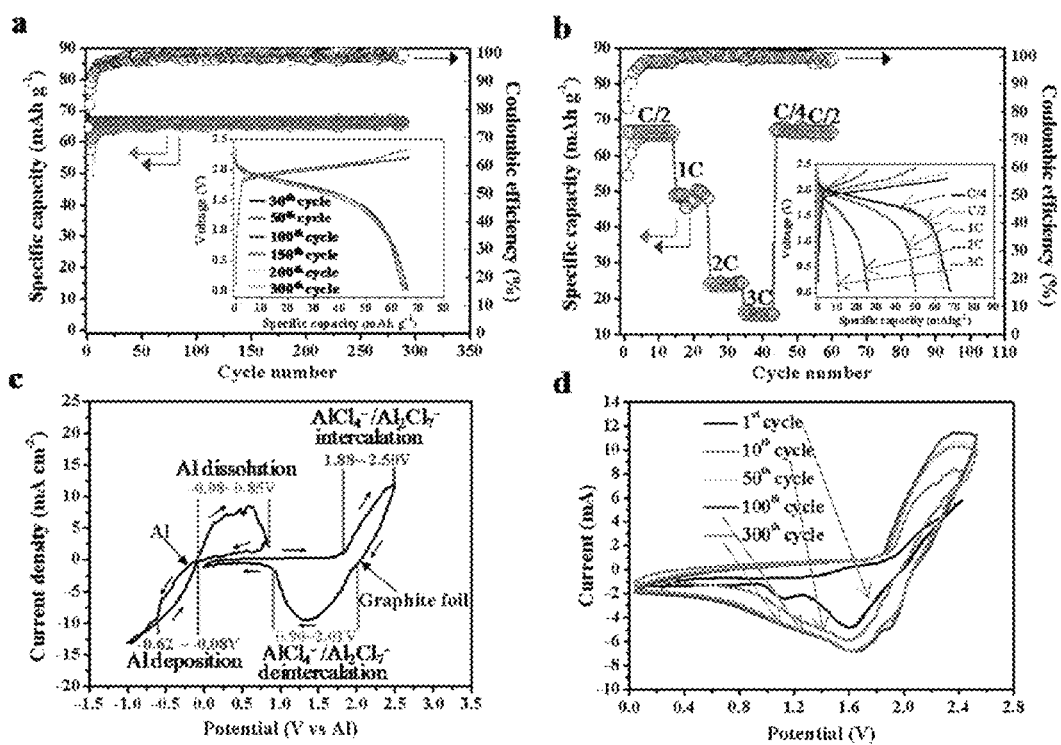
FIG. 20: Cycling properties of Al-graphite battery. a, Long-term stability test of Al/graphite battery at a C-rate of about C/2 (about 33 mA g$^{-1}$), indicating the battery can be cycled to about 100% depth of discharge for 300 cycles or more and exhibited about 99% Coulombic efficiency. The charge and discharge behavior of the battery was stable (see inset in (a)). b, Capacity retention and galvanostatic charge/discharge curves (see inset in (b)) of an Al/graphite battery cycled at various C rates (current densities), showing the stable cycling stability at different charge-discharge current densities. c, Cyclic voltammetry curves of Al foil and graphite foil at a scan rate of 10 mV s$^{-1}$. d, Cyclic voltammetry curves of Al/graphite cell at a scan rates of 10 mV s$^1$ in two-electrode configuration.
Figure 21:
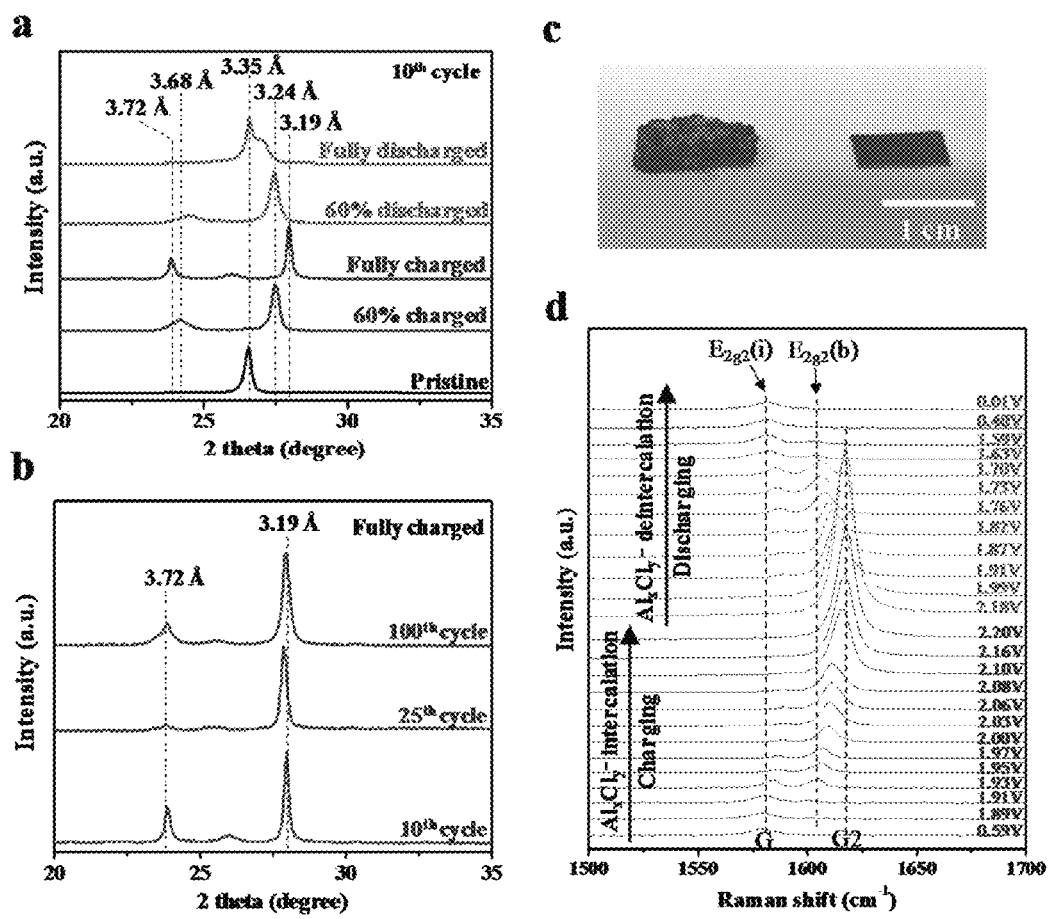
FIG. 21: Charge-discharge mechanism of Al/graphite battery. a, Ex situ X-ray diffraction patterns of the graphite foil in different charging and discharging states at the 10$^{th}$ cycle. b, Ex situ X-ray diffraction patterns of the graphite foil in fully charged state at 10$^{th}$, 25$^{th}$ and 100$^{th}$ cycles. c, Photographs of graphite foil before and after being charged in AlCl$_3$/[EMIm]Cl ionic liquid electrolyte, indicating the graphite foil was expanded to about 10 times the original thickness after being charged in a three-electrode cuvette cell. d, In situ Raman spectra were measured during charging and discharging of the cell. All electrochemical studies were performed in an about 1.3:1 AlCl$_3$:[EMIm]Cl ionic liquid electrolyte.

Most of the graphite expansion occurred during the first cycles of the battery in an activation stage of the battery. Once a steady state is reached, the long-term cycling measurement shows that the Al/GF battery still retained about 100% of the specific capacity (about 66 mAhg$^{-1}$) after 300 cycles or more under a current density of about 33 mA g$^{-1}$ (about C/2) with about 98-100% Coulombic efficiency (see FIG. 20a). In addition, the Al/GF battery maintained a high discharge voltage plateau (about 2.25 V to about 1.5 V) after 200 charge/discharge cycles or more (see the inset in FIG. 20a), making it a feasible and promising cell for energy storage. No decay in the battery capacity was observed as long as care was taken to mitigate against electrode shortening caused by excessive graphite cathode expansion. Rate-capability measurement showed that the Al/GF cell in a AlCl$_3$/[EMIm]Cl (about 1.3 in molar ratio) electrolyte retained excellent cycling stability at various rates with about 98-100% Coulombic efficiency (FIG. 20b). A high capacity of about 67 mAh g$^{-1}$ was derived at the charge/discharge current density of about 16.5 mA g$^{-1}$ (a C-rate of about C/4) at the end of the measurement. However, when the C-rate increased from about C/2 (about 33 mA g$^{-1}$) to about 1C (about 66 mA g$^{-1}$) and about 3C (about 198 mA g$^{-1}$), the Al/GF cell delivered decreased capacities of about 24 mAh g$^{-1}$ and 16 mAh g$^{-1}$, respectively (see FIG. 20b). The lowered capacity at higher rate was possibly due to diffusion-limited nature of the intercalation-de-intercalation mechanism. Apart from the evaluation of charge-discharge characteristics by galvanostatic cycling (FIGS. 20a and b), cyclic voltammetry (CV) performance of the Al/GF battery was also investigated. The electrochemical behavior of Al foil anode and graphite foil cathode in AlCl$_3$/[EMIm]Cl (about 1.3 in molar ratio) electrolyte were investigated by CV at a scan rate of 10 mV s$^{-1}$ (FIG. 20c). A reduction wave (from about −0.62 to about −0.08 V vs. Al) on the forward scan and a single oxidation wave (from about −0.08 to about 0.85 V vs. Al) on the reverse scan were observed on the Al anode (FIG. 20c, left plot). The reduction and oxidation corresponded to Al deposition and dissolution, respectively. As can be observed, the Al anode exhibited stable reversible deposition and dissolution behavior in the optimized AlCl$_3$-[EMIm]Cl electrolyte. On the graphite foil cathode side, an oxidation wave (about 1.88-2.5 V vs Al) and a reduction wave (about 0.9-2.01 V) were obtained in the AlCl$_3$-[EMIm]Cl ionic liquid electrolyte, as shown in the right of FIG. 20c. The oxidation and reduction are attributed to intercalation and de-intercalation of anions into/from graphite respectively. The likely anion involved in intercalation was AlCl$_4^-$ according to the ion composition in a AlCl$_3$/[EMIm]Cl (about 1.3 in molar ratio) electrolyte. The voltage range of AlCl$_4^-$ intercalation/de-intercalation (about 0.9-2.5 V) (FIG. 20c) was consistent with the cathodic voltage range of another dual-graphite cell (about 0.9-2.15 V vs Al) (intercalation of EMI$^+$ into graphite on anode side and intercalation of AlCl$_4^-$ into graphite on cathode side). Even though Al$_2$Cl$_7^-$ is a larger ion, the size of AlCl$_4^-$ and Al$_2$Cl$_7^-$ anions along one dimension is similar. The Al$_2$Cl$_7^-$ ion could still be involved in the intercalation/de-intercalation process in graphite as a minor reaction during the charge-discharge reaction of Al/GF battery. Additionally, electrochemical intercalation reactions occurring at the graphite cathode were further corroborated by evidence of visible graphite expansion to the eye after repeated charge and discharge cycles (FIG. 21c). Although it has been proposed that graphite oxidation in AlCl$_3$-[EMIm]Cl involves intercalation of Cl$_2$, the potential of such oxidative intercalation is about 0.6 V higher than that of the AlCl$_4^-$ intercalation potential. Therefore, AlCl$_4^-$ and Al$_2$Cl$_7^-$ intercalation into the graphite cathode should be the dominant process during battery discharge. Two-electrode Swagelok-type cell was used to evaluate the cycling stability of Al/GF battery in AlCl$_3$/[EMIm]Cl (about 1.3 in molar ratio) electrolyte with about 100% depth of discharge (from about 2.5 and about 0.01 V) at a fixed scan rate of 10 mV s$^{-1}$ (See FIG. 20d). As shown in FIG. 20d, both of charge and discharge capacities of the Al/GF battery increased and then stabilized with increasing scanning cycles (indicated by larger areas enclosed by the loop) and reached maximum charge-discharge capacities after 50 cycles. The charge-discharge pattern of the battery maintained steady up to 300 cycles, indicating highly stable charge-discharge property of the Al/GF battery in a AlCl$_3$/[EMIm]Cl (about 1.3 in molar ratio) electrolyte (See FIG. 20d).

Charge-Discharge Mechanism of Al-Graphite Battery.

To further glean the mechanism of intercalation/de-intercalation process, ex situ XRD measurement and in situ Raman spectroscopy of the graphite cathode were performed. FIG. 21a shows the ex situ XRD measurement of graphite cathode in the Al/GF cell cycled at a constant current density (about 33 mA g$^{-1}$), and the cell had been cycled for 10 cycles prior to the measurement. The graphite cathodes were charged or discharged at different desirable capacities (see Methods for details). The pristine graphite foil showed a single (002) graphite peak at 2θ=about 26.55° (d-space=about 3.35 Å) (FIG. 21a). After charging the Al/GF battery to about 60% of full capacity, the (002) peak vanished, and two new peaks at about 27.44° (about 3.24 Å) and about 24.13° (about 3.68 Å) appeared (FIG. 21a). This intensity is an example for a stage n GIC, where the most dominant peak is the (00n+1), and the second most dominant peak is the (00n+2). By increasing the charging state from about 60% charged to the fully charged, the distance between the (00n+1) and (00n+2) peaks was gradually increasing (FIG. 21a), as more AlCl$_4^-$/Al$_2$Cl$_7^-$ anions were intercalated. By determining the ratio of the d(n+2)/d(n+1) peak position and correlating these to the ratios of stage pure GICs, one is able to assign the most dominant stage phase of the observed GIC. Assigning the (00l) indices, one is able to calculate the periodic repeat distance (k), the intercalant gallery height (di) and the gallery expansion (Δd). Accordingly, the height of intercalant gallery height (di) was calculated to be about 5.74 Å, which was similar to that of the theoretical length of AlCl$_4^-$ and Al$_2$Cl$_7^-$ anions (about 5.28 Å) along the shorter side, providing the evidence of the intercalation of AlCl$_4^-$/Al$_2$Cl$_7^-$ anions into graphite during charging. Further de-intercalation leads to a reverse staging transition (see XRD patterns of about 60% discharge and fully discharged in FIG. 21a). The (002) graphite peak (about 3.35 Å) reformed at the fully discharged state (FIG. 21a). However, a broader (002) graphite peak was observed in the XRD pattern of fully discharged sample (FIG. 21a), as compared to (002) peak of pristine graphite foil. The difference in width is likely due to a decrease in correlation length along the layer axis. It could also be due to some AlCl$_4^-$ and Al$_2$Cl$_7^-$ anions remaining between the graphitic layers. FIG. 21b shows the XRD patterns of fully charged graphite samples after being cycled for 10 (from FIG. 21a), 25 and 100 cycles. The distance between the (00n+1) (about 3.19 Å) and (00n+2) (about 3.72 Å) peaks remained, indicating the Al/graphite battery reached a steady capacity after being cycled for 10 cycles. FIG. 21c shows the photographs of graphite foil before and after being charged in $AlCl_3$/[EMIm]Cl ionic liquid electrolyte, indicating the graphite foil was expanded to about 10 times the original thickness after being charged in a three-electrode cuvette cell. In situ Raman spectroscopy is used to investigate $AlCl_x^-$ anions intercalation into graphite foil. FIG. 21d displays in situ Raman spectra of the graphite cathode during charging and discharging, with the voltage values on the spectra corresponding to the intercalation and de-intercalation status of $AlCl_4^-/Al_2Cl_7^-$ in graphite. At the beginning of charging (FIG. 21d, spectrum of about 0.59 V) and at the end of discharging (FIG. 21d, spectrum of about 0.01 V), typical Raman spectra of graphite with a main G-band peak at about 1578 $cm^{-1}$ were observed. Starting from spectrum of about 1.91 V, a shoulder peak at higher wavenumbers showed up on the G-band (FIG. 21d). The intensity of the shoulder peak drastically increased and overtook the intensity of the initial G-band (corresponds to charging voltage of about 1.95 V), as shown in FIG. 21d. Splitting of the G-band (about 1578 $cm^{-1}$) into a double peak $E_{2g2}(i)$ (about 1578 $cm^{-1}$) and $E_{2g2}(b)$ (about 1600 $cm^{-1}$) in Raman spectrum is an indication of ion intercalation into the graphite. With higher charging voltage of the Al/GF cell (about 1.95 to about 2.20 V), the G-band at about 1578 $cm^{-1}$ gradually diminished and turned into background noise (see spectra of about 1.95 V to about 2.20 V in FIG. 3d), and a sharp Raman peak was finally observed at about 1617 $cm^{-1}$ (G2 band) (spectrum of about 2.20 V, FIG. 21d) corresponding to the stage 2 of graphite intercalation compounds. During discharging, opposite trends were seen in accordance with the de-intercalation of $AlCl_4^-/Al_2Cl_7^-$ from graphite structure (see FIG. 21d). The intensity of G2 band first gradually decreased with decreasing discharge voltage and shifted from about 1617 $cm^{-1}$ (G2) to about 1604 $cm^{-1}$ ($E_{2g2}(b)$) (spectra of about 2.18 V to about 1.76 V). Then, the $E_{2g2}(b)$ band diminished and disappeared followed by reappearance and growth of the initial $E_{2g2}(i)$ (about 1578 $cm^{-1}$) (see spectra of about 1.73 V to about 0.01 V in FIG. 21d). A final typical graphite Raman spectrum was recovered (spectrum of about 0.01 V, FIG. 21d). The reversible changes of ex situ XRD measurement (FIG. 21a) and in situ Raman spectroscopy (FIG. 21d) strongly supported the intercalation/de-intercalation mechanism and high reversibility of the Al/GF battery.

Flexible Al-Graphite Battery.

FIG. 22 shows the robustness of flexible Al/Graphite battery turning on a red LED and charging a cell phone in bent condition. An Al anode, a glass filter separator, and a graphite cathode were sealed in a thermal laminating pouch filled with $AlCl_3$/[EMIm]Cl (about 1.3 in molar ratio) electrolyte (FIG. 22a). The flexible Al/Graphite battery can turn on a red LED in non-bending condition (FIG. 22b,c). The red LED kept in the light emitting state when the battery was bent at about 180° (FIG. 22b,c). FIG. 22d shows the demonstration of two Al/Graphite batteries in series (connected to a DC power converter step up module from about 3V to about 5V) to charge a smart phone, even in the bending condition. These demonstrations indicate that the Al/Graphite battery is a feasible power source for the next-generation electronic environment based on bendable, implantable, and wearable devices.

In summary, this examples describes an improved Al-ion battery system using a flexible graphite foil as a cathode combined with an aluminum anode in an ionic liquid electrolyte of $AlCl_3$-[EMIm]Cl. The Al/graphite battery displayed excellent electrochemical features with stable cycling behavior over 200 charge-discharge cycles with a high discharge plateau in the voltage range of about 2.25 V to about 1.5 V. The estimated energy density of Al-ion battery with a graphite foil as a cathode against an aluminum anode is about 662 Wh $kg^{-1}$, which is comparable to that of Li-ion battery. The theoretical capacities and energy cost for the aluminum-ion battery including graphite cathode are calculated and shown in Table 1 of FIG. 23. From these calculations, the Al/graphite battery has an edge over the state-of-the-art Li-ion batteries. The Al side of the battery has a very high specific capacity of about 2980 Ah/kg in some embodiments. In some embodiments, the cathode side specific capacity sets a cap of the battery capacity and can reach up to about 372 Ah/kg, or more, assuming a similar intercalation degree as lithium ions in graphite. Considering the low cost and safe nature of the Al/graphite battery, the battery could be utilized as a power source for various energy applications, such as electric vehicles and portable electronic devices, as energy storage devices for renewable energy, and substitute current lithium-ion batteries with better cell designs and advanced material developments.

Methods

Preparation of Ionic Liquid Electrolytes.

A room temperature ionic liquid electrolyte was made of 1-ethyl-3-methylimidazolium chloride ([EMIm]Cl, 97%, Acros chemicals) and anhydrous aluminum chloride ($AlCl_3$, 98.5%, Acros chemicals). The preparation of $AlCl_3$-([EMIm]Cl) ionic liquid electrolytes was conducted in an argon-filled glove box ($AlCl_3$ is highly reactive). The electrolytes were prepared by dissolving anhydrous $AlCl_3$ into [EMIm]Cl and stirring at room temperature for about 10 minutes, which resulted in a clear light yellow solution. The molar ratio of $AlCl_3$ to [EMIm]Cl was varied from about 0.8 to about 2.7. The dominant anions in basic melts ($AlCl_3$/[EMIm]Cl molar ratio<1) are $Cl^-$ and $AlCl_4^-$. On adding excess of $AlCl_3$ to the acidic melts ($AlCl_3$/[EMIm]Cl molar ratio>1), chloroaluminate anions such as $Al_2Cl_7^-$, $Al_3Cl_{10}^-$, and $Al_4Cl_{13}^-$ are formed.

Electrochemical Measurements.

Preliminary two-electrode cell tests were carried out in both of a 1.4 mL plastic cuvette cell and a ½-inch Swagelok-type cell with a MTI battery analyzer (BST8-WA, Richmond). An aluminum foil (thickness of about 0.015 mm, MTI Corporation) was selected as anode, and a graphite foil (thickness of about 0.13 mm, GTA Flexible Graphite) cathode was obtained from GrafTech International, Ltd. For comparison, carbon fiber paper (GDL10 AA, SGL Carbon) and carbon black (Black Pearl 2000, Cabot) were also used as cathode material. A Whatman 934-AH glass fiber filter was used as the separator membrane. An Al anode, one of those cathodes, and a separator were sealed into the plastic cuvette cell containing $AlCl_3$:[EMIm]Cl molar ratio of about 1.3:1 electrolyte with a flat rubber in an argon-filled glove box. A galvanostatic discharge/charge reaction was performed at the cell voltage of about 2.3 to about 0.01 V at different current densities (about 6.6 or about 33 mA $g^{-1}$). The Swagelok cell was constructed using a graphite foil (GF) (about 0.018 g) as cathode, four layers of the glass separator membrane, and an aluminum foil (about 0.006 g) as anode. Then, few drops of ionic liquid electrolyte ($AlCl_3$/[EMIm]Cl ratios from about 1.1, about 1.2, about 1.3, about 1.5, about 1.8 and about 2.7) were filled and sealed in the glove box. The Swagelok cell was charged and discharged at the cell voltage of about 2.5 to about 0.01 V at a constant current density of about 33 mA $g^{-1}$. Short-term charge-discharge test of the Al/graphite battery (in Swagelok cell) was carried out at current densities from about 16.5 to about 198 mA g$^{-1}$ in the AlCl$_3$/[EMIm]Cl (about 1.3 in molar ratio) ionic liquid electrolyte. In the case of long-term charge-discharge, the current density was set at about 33 mA g$^{-1}$. The cyclic voltammetry measurement was carried out using a potentiostat/galvanostat model VMP3 (Bio-Logic) in both three-electrode and two-electrode modes. The working electrode was an aluminum foil or a GF, the auxiliary electrode included a platinum foil, and an Al foil was used as the reference electrode. All three electrodes were sealed into a plastic cuvette cell containing AlCl$_3$:[EMIm]Cl molar ratio of about 1.3:1 electrolyte following the same sealing procedure as above. The CV measurements were carried out in the laboratory at the ambient environment. The scanning range was set from about −1 to about 0.85 V (vs. Al) for Al foil and about 0 to about 2.5 V (vs. Al) for the GF, and the scan rate was 10 mV s$^{-1}$. For the two electrode mode (Swagelok cell), an Al/GF battery were charged and discharged in AlCl$_3$:[EMIm]Cl molar ratio of about 1.3:1 electrolyte. The Swagelok cell assembly was performed following the same procedure mentioned above. All electrochemical measurement were performed in the laboratory in the ambient environment at 25±1° C.

In-Situ Raman Spectroscopy and Ex-Situ X-Ray Diffraction Studies of Graphite Cathode During Charge and Discharge.

For the simultaneous use of in-situ Raman and galvanostatic charge/discharge reaction measurements, a cuvette cell (0.35 mL, Starna Cells) with random orientation quartz windows was used. An aluminum foil and a GF were used as anode and cathode, respectively. The electrolyte was AlCl$_3$:[EMIm]Cl about 1.3:1 by molar mixture. The electrochemical cell was assembled in the glove box. Raman spectra were excited by a HeNe laser (633 nm) at a resolution of 2 cm$^{-1}$ in the range between 1400 and 1800 cm$^{-1}$. The spectra data were collected after few successive charge/discharge scans of the Al/GF battery between about 2.3 to about 0.01 V at a current density of about 33 mA g$^{-1}$. For ex-situ X-ray diffraction (XRD) study, an Al/GF battery (in Swagelok configuration) was charged and discharged at a constant current density of about 33 mA g$^{-1}$, the reactions were stopped after about 60% charge, fully charged, and about 60% discharge capacities after 10 charge-discharge cycles. In addition, the fully charged samples were obtained after 25 and 100 charge-discharge cycles, respectively. After either charge or discharge reaction, the GF cathode was removed from the cell in the glove box. To avoid the reaction between the cathode and air/moisture in the ambient atmosphere, the cathode was placed onto a glass slide, then the sample was wrapped in a Scotch tape. The wrapped samples were removed from the glove box to air to perform ex-situ XRD measurement immediately. Ex-situ XRD measurement was carried out on a PANalytical X'Pert instrument.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," "connecting," and "connection" refer to an operational coupling or linking Connected objects can be directly coupled to one another or can be indirectly coupled to one another, such as through another set of objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:

1. A metal-ion battery comprising:
an anode including aluminum;
a cathode including a layered, active material; and
an electrolyte disposed between the anode and the cathode to support reversible deposition and dissolution of aluminum at the anode and reversible intercalation and de-intercalation of anions at the cathode,
wherein the layered, active material is a pyrolytic graphite foil.

2. The battery of claim 1, wherein the layered, active material has a porosity in the range of 0.05 to 0.95.

3. The battery of claim 1, wherein the electrolyte corresponds to a mixture of an aluminum halide and an ionic liquid, and a molar ratio of the aluminum halide to the ionic liquid is greater than 1.1.

4. The battery of claim 3, wherein the aluminum halide is AlCl$_3$, and the ionic liquid is 1-ethyl-3-methylimidazolium chloride.

5. The battery of claim 4, wherein the molar ratio of AlCl$_3$ to 1-ethyl-3-methylimidazolium chloride is greater than 1.2.

6. The battery of claim 1, wherein a water content of the electrolyte is no greater than 1,000 ppm.

7. A metal-ion battery comprising:
an aluminum anode;
a porous graphite cathode; and
an ionic liquid electrolyte disposed between the aluminum anode and the porous graphite cathode,
wherein the porous graphite cathode is a graphite foam that has a porosity of about 0.9.

8. The battery of claim 7, wherein the ionic liquid electrolyte corresponds to a mixture of an aluminum halide and an ionic liquid, and a molar ratio of the aluminum halide to the ionic liquid is greater than 1.1.

9. The battery of claim 7, wherein a water content of the ionic liquid electrolyte is no greater than 1,000 ppm.

10. The battery of claim 9, wherein the water content is no greater than 400 ppm.

11. A method of manufacturing a metal-ion battery, comprising:
providing an anode including aluminum;
providing a porous graphite cathode capable of intercalating ions during charging and de-intercalating the ions during discharging, wherein the porous graphite cathode is a graphite foam that has a porosity of about 0.9; and providing an electrolyte capable of supporting reversible deposition and dissolution of aluminum at the anode and reversible intercalation and de-intercalation of the ions at the porous graphite cathode.

12. The method of claim 11, wherein providing the porous graphite cathode includes forming the graphite foam through deposition on a porous, sacrificial template.

13. The method of claim 11, wherein providing the porous graphite cathode includes expanding a graphite material through exfoliation of intercalated graphite or through electrochemical gas evolution.

14. The method of claim 11, wherein providing the electrolyte includes electrochemically drying the electrolyte, such that a water content of the electrolyte is no greater than 400 ppm.

15. The battery of claim 4, wherein the molar ratio of $AlCl_3$ to 1-ethyl-3-methylimidazolium chloride is greater than 1.2 and up to 1.8.

\* \* \* \* \*